United States Patent
Handa et al.

(10) Patent No.: US 6,882,130 B2
(45) Date of Patent: Apr. 19, 2005

(54) BATTERY-DRIVEN ELECTRONIC DEVICE AND MOBILE COMMUNICATION APPARATUS

(75) Inventors: Hiroyuki Handa, Hirakata (JP); Takuya Ishii, Suita (JP); Yasufumi Nakajima, Hirakata (JP); Yasuhiko Bito, Minamikawachi-gun (JP); Shinji Kasamatsu, Katano (JP); Yoshiaki Nitta, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 40 days.

(21) Appl. No.: 10/451,508

(22) PCT Filed: Apr. 17, 2002

(86) PCT No.: PCT/JP02/03795
§ 371 (c)(1),
(2), (4) Date: Jun. 20, 2003

(87) PCT Pub. No.: WO02/087054
PCT Pub. Date: Oct. 31, 2002

(65) Prior Publication Data
US 2004/0067740 A1 Apr. 8, 2004

(30) Foreign Application Priority Data
Apr. 17, 2001 (JP) ........................................ 2001-117841

(51) Int. Cl.[7] .............................................. H01M 10/46
(52) U.S. Cl. ..................................................... 320/135
(58) Field of Search ................................ 320/112, 127, 320/132, 135, 140

(56) References Cited

U.S. PATENT DOCUMENTS

| 5,161,097 A | 11/1992 | Ikeda |
| 5,583,421 A | 12/1996 | Barbehenn et al. |
| 5,604,924 A | 2/1997 | Yokoya |
| 6,104,759 A * | 8/2000 | Carkner et al. ............. 375/295 |

FOREIGN PATENT DOCUMENTS

| JP | 4-315320 | 11/1992 |
| JP | 6-348654 | 12/1994 |
| JP | 2000-253653 | 9/2000 |
| JP | 2001-007715 | 1/2001 |
| JP | 2001-068168 | 3/2001 |

\* cited by examiner

*Primary Examiner*—Edward H. Tso
(74) *Attorney, Agent, or Firm*—Merchant & Gould P.C.

(57) ABSTRACT

The present invention provides a battery-driven electronic device for which a long time use of the battery can be achieved and mobile communications equipment such as a portable telephone. Even if the time at which the output voltage of a battery 201 becomes below the supply voltage required by a load 206 including a power amplifier for wireless communications comes earlier than a conventional lithium ion battery because of its discharge characteristics that the battery voltage change ratio is 0.25 or more, a step-up and -down converter 200 operates as follows. When the output voltage of the battery is higher than the supply voltage required by the load, the voltage is set to a predetermined supply voltage by the step-down operation mode. When the output voltage of the battery is decreased and becomes lower than the supply voltage required by the load, the voltage is set to a predetermined supply voltage by the step-up operation mode. Thus, even for a battery employing a new material having a high energy density, a long term use of the battery can be achieved.

26 Claims, 19 Drawing Sheets

BATTERY-DRIVEN ELECTRONIC DEVICE AND MOBILE COMMUNICATION APPARATUS

TECHNICAL FIELD

The present invention relates to a battery-driven electronic device employing a battery as its input source and mobile communications equipment such as portable telephones and portable communications terminals in which such a battery-driven electronics device is mounted.

BACKGROUND ART

For wireless communications devices, information terminals and other electronic devices employing batteries as their power source for which the convenience of portability is required, there is a demand for a long time use after charging when the battery is a secondary battery or after battery exchange when the battery is a primary battery, in addition to compactness and lightweightness.

The configuration shown in FIG. 19 commonly is used for such a battery-driven electronic device. As shown in FIG. 19, a conventional battery-driven electronic device uses as its input source a battery typified by a conventional lithium ion battery, more specifically, a battery 401 employing lithium cobaltate as the positive electrode, graphite as the negative electrode, and a nonaqueous solvent containing lithium supporting electrolyte as the electrolyte and having an average battery voltage of 3.7 V at room temperature as the discharge characteristics, and supplies a predetermined voltage Eo to a load 406 via a step-down converter constituted by switching means 402, rectification switching means 403, an inductor 404, and an output capacitor 405.

Hereinafter, the terms will be defined. An "average battery voltage" is defined as a voltage obtained by dividing the time integration of the battery voltage when discharge is performed at a rated current from the rated charge state to the rated discharge capacity by the discharge time. A "rated charge end voltage" is defined as a battery voltage at the end of a charge operation necessary to obtain the rated discharge capacity. A "rated discharge end voltage" is defined as a battery voltage when the rated discharge capacity is obtained. A "rated discharge last stage voltage" is defined as a battery voltage when a large change occurs in the slope of the discharge voltage characteristics during discharging at the rated current.

First, the operation of the step-down converter will be described. When the voltage of the battery 401 is taken as Ei and the switching means 402 is turned on, a difference (Ei−Eo) between the output voltage of the battery (hereinafter, referred to as a "battery voltage") Ei and a supply voltage Eo is applied to the inductor 404. In this case, current flows from the battery 401 to the output capacitor 405 via the switching means 402 and the inductor 404. The current in the inductor 404 increases, so that magnetic energy is accumulated in the inductor 404. This period is taken as Ton.

Then, when the switching means 402 is turned off, the voltage of the inductor 404 is inverted, and the rectification switching means 403 is turned on, and thus the supply voltage Eo is applied to the inductor 404. In this case, the current in the inductor 404 flows through the rectification switching means 403 to the output capacitor 405. This current is decreased, and the magnetic energy accumulated in the inductor 404 is released. This period is taken as Toff.

When the accumulation and the release of the magnetic energy is in equilibrium through such an on/off operation of the switching means 402, the increase and the decrease in the current flowing in the inductor 404 is in equilibrium. When the inductance of the inductor 404 is taken as L, the following relationship is satisfied:

$$(Ei-Eo)\cdot Ton/L = Eo\cdot Toff/L$$

When the switching cycle T=Ton+Toff, the following relationship is satisfied between the input and the output of the step-down converter:

$$Eo/Ei = Ton/T$$

That is to say, in the step-down converter, the supply voltage Eo to the load 406 can be adjusted under the limitation of Ei>Eo with respect to variations of the battery voltage Ei by the on/off control of the switching means 402.

On the other hand, when the voltage Eo that should be supplied to the load 406 is higher than the battery voltage Ei, a step-up converter is used instead of the step-down converter. The configuration using a step-up converter is disclosed, for example, in JP 4-315320 A.

The conventional lithium ion battery as the battery 401 is characterized in that the discharge characteristics are flat, that is, a reduction in a battery voltage associated with discharge is small (the battery voltage change ratio is small). Thus, the battery voltage can be close to the voltage that is required to be supplied to the load 406, and the loss in the step-down converter can be decreased. In addition, this relationship does not change with discharging, so that the energy of the battery can be used efficiently.

In the configuration of the conventional battery-driven electronic device, when a step-down converter is used, the battery voltage Ei should be higher than the voltage Eo that is required to be supplied to the load. On the other hand, it is better that the battery voltage Ei is close to the supply voltage Eo in order to operate the step-down converter efficiently. When a step-up converter is used, the battery voltage Ei should be lower than the voltage Eo that is required to be supplied to the load. In this case as well as in the case of the step-down converter, it is better that the battery voltage Ei is close to the supply voltage Eo in order to operate the step-up converter efficiently.

Therefore, the characteristics required for batteries are that the battery voltage Ei is slightly higher or slightly lower than the supply voltage Eo and that the discharge characteristics are flat. For batteries, research has been carried out for achieving large capacity while satisfying these characteristics. The battery use time, which is a period until the battery voltage that decreases with discharging reaches the lower limit of the voltage at which the battery can be used, has been prolonged by achieving a large capacity with the weight and volume unchanged.

The flatter the discharge characteristics are, the more significant a decrease of the battery voltage tends to be when approaching the last stage of discharging. That is to say, the energy that is left at this point is small. The conventional lithium ion battery employing lithium cobaltate as the positive electrode, graphite as the negative electrode, and a nonaqueous solvent containing lithium supporting electrolyte as the electrolyte and having an average battery voltage of 3.7 V at room temperature has the most excellent discharge characteristics at present.

However, although battery-driven electronic devices have become more compact and high performance and there is a demand for improvement in compactness and large capacity of batteries, that is, improvement in energy density, the theoretical limit is almost reached in terms of large capacity for the above-described conventional lithium ion batteries. Then, a lithium ion battery employing a new material that allows improvement of the energy density of batteries is necessary. However, the batteries made of a material that can realize a high energy density have problems in that the average battery voltage is lower and the battery voltage change ratio is larger than those of the conventional lithium ion batteries.

When the lithium ion battery employing such a new material is incorporated into equipment in which the conventional lithium ion battery is used, and the supply voltage required by the load in the electronic device is between the rated charge end voltage and the rated discharge end voltage of the battery, then the following problem arises. The battery voltage is decreased with discharging, and thus the time at which the battery voltage becomes lower than the supply voltage required by the load is reached earlier than the conventional lithium ion battery, so that the advantage of the high energy density resulted from the new material cannot be utilized. Consequently, the use time of the equipment is shorter than that of the conventional lithium ion battery.

Furthermore, it is considered that two cells, each of which is a lithium ion battery made of a new material having a low average battery voltage and a large battery voltage change ratio, are used to increase the battery voltage and are combined with a step-down converter. However, the voltage difference between the input and the output becomes large, so that it is difficult to realize high efficiency of the step-down converter, and the input voltage is increased. Therefore, it is necessary to increase the withstand voltage of capacitors or semiconductors, and therefore the efficiency is further decreased and the components become larger so that compactness cannot be achieved.

DISCLOSURE OF INVENTION

The present invention is carried out, based on the fact that the energy of a battery can be utilized effectively by combining a lithium ion battery made of a new material and a step-up and -down converter, in order to solve the problem that since a lithium ion battery made of a new material that can improve the energy density of a battery has a low average battery voltage and a large battery voltage change ratio, high capacity energy cannot fully be utilized when this battery is used in a battery-driven electronic device.

It is an object of the present invention to provide a battery-driven electronic device that allows a long term use of a battery and can be used with batteries having various discharge characteristics, and mobile communications equipment in which such a battery-driven electronic device is mounted.

In order to achieve the above object, a first battery-driven electronic device of the present invention includes a battery having discharge characteristics that a battery voltage change ratio, which is a value obtained by dividing a voltage difference (Ec–Ed) by Ec, where Ec is an open circuit voltage after a rated charge end voltage is reached, and Ed is an open circuit voltage after a rated discharge end voltage is reached, is 0.25 or more; a step-up and -down converter that has an output voltage of the battery as an input source, performs at least a step-down operation mode and a step-up operation mode in accordance with the output voltage of the battery, and outputs a predetermined voltage; and a load to which the output voltage of the step-up and -down converter is supplied.

According to this configuration, even if the time at which the output voltage of a battery becomes below the supply voltage required by a load comes earlier than a conventional lithium ion battery because of the discharge characteristics that the battery voltage change ratio is 0.25 or more, a step-up and -down converter operates as follows. When the output voltage of the battery is higher than the supply voltage required by the load, the voltage is set to a predetermined supply voltage by the step-down operation mode. When the output voltage of the battery is decreased and becomes lower than the supply voltage required by the load, the voltage is set to the predetermined supply voltage by the step-up operation mode. Thus, even for a lithium secondary battery, for example, employing a new material having a high energy density, a long term use of the battery can be achieved.

In order to achieve the above object, a second battery-driven electronic device of the present invention includes a battery having discharge characteristics that a battery voltage change ratio, which is a value obtained by dividing a voltage difference (Ec–Ed) by Ec, where Ec is an open circuit voltage after a rated charge end voltage is reached, and Ed is an open circuit voltage after a rated discharge end voltage is reached, is 0.25 or more; a step-up and -down converter that has an output voltage of the battery as an input source, performs a step-up and -down operation mode in accordance with the output voltage of the battery, and outputs a predetermined voltage; and a load to which the output voltage of the step-up and -down converter is supplied.

According to this configuration, even if the time at which the output voltage of a battery becomes below the supply voltage required by a load comes earlier than a conventional lithium ion battery because of the discharge characteristics that the battery voltage change ratio is 0.25 or more, a step-up and -down converter sets the output voltage of the battery to the supply voltage required by the load by the step-up and -down operation mode. Thus, even for a lithium secondary battery, for example, employing a new material having a high energy density, a long term use of the battery can be achieved.

In the first and the second battery-driven electronic devices, it is preferable that the battery is a prismatic battery, and the energy density per unit volume of the prismatic battery is 460 Wh/1 or more.

Alternatively, in the first and the second battery-driven electronic devices, it is preferable that the battery is cylindrical battery, and the energy density per unit volume of the cylindrical battery is 530 Wh/1 or more.

In the first and the second battery-driven electronic devices, it is preferable that a voltage required to be supplied to the load is within a range of the rated charge end voltage and a rated discharge last stage voltage of the battery. In this case, it is preferable that the difference between an average battery voltage associated with discharge characteristics of the battery and the supply voltage to the load is within a predetermined range.

Thus, the loss in the step-up and -down converter can be reduced, and the use time of the battery can be prolonged further.

In the first and the second battery-driven electronic devices, it is preferable that the voltage required to be supplied to the load has a predetermined variation range, and the entire variation range of the supply voltage or a part thereof matches the entire range of the rated charge end voltage and the rated discharge last stage voltage of the battery or a part thereof. In this case, it is preferable that the voltage required to be supplied to the load has a predetermined variation range, a probability distribution of the required supply voltage in the predetermined variation range has one peak value, and a difference between the required supply voltage at the peak of the probability distribution and an average battery voltage associated with discharge characteristics of the battery is within a predetermined range.

Thus, the loss in the step-up and -down converter can be reduced, and the use time of the battery can be prolonged further.

In the first and the second battery-driven electronic devices, it is preferable that the load comprises a power amplifier for wireless transmission, and such a battery-driven electronic device is mounted in mobile communications equipment.

In the first battery-driven electronic device, it is preferable that when a difference between the supply voltage to the load and the output voltage of the battery is within a predetermined range, the step-up and -down converter has a function to fix an active component interposed between its input and its output to be on, because the loss in the step-up and -down converter can be reduced further, and the use time of the battery can be prolonged further.

In this case, a step-up and -down converter having a first configuration includes first switching means whose one end is connected to one end of the battery; first rectification switching means whose one end is connected to the other end of the first switching means, and whose other end is connected to the other end of the battery; an inductor whose one end is connected to the other end of the first switching means; second switching means whose one end is connected to the other end of the inductor, and whose other end is connected to the other end of the battery; second rectification switching means whose one end is connected to one end of the second switching means, and whose other end is connected to one end of the load; an output capacitor whose one end is connected to one end of the load, and whose other end is connected to the other end of the battery and the other end of the load and that supplies a voltage to the load; a detecting circuit that detects the supply voltage at the output capacitor, outputs an error signal between the detected supply voltage and a first preset value (Eoh) for performing the step-down operation mode as a first control signal (Ve1), and outputs an error signal between the detected supply voltage and a second preset value (Eol) for performing the step-up operation mode as a second control signal (Ve2); a first control driving circuit that controls the first switching means to be on/off so that the supply voltage is adjusted to the first preset value in accordance with the first control signal; and a second control driving circuit that controls the second switching means to be on/off so that the supply voltage is adjusted to the second preset value in accordance with the second control signal.

The detecting circuit includes a series circuit of a first detection resistor, a second detection resistor and a third detection resistor, to which the supply voltage is applied; a reference voltage source that outputs a reference voltage; a first error amplifier to which a potential at a connection point between the first detection resistor and the second detection resistor and the reference voltage are input, and outputs the first control signal; and a second error amplifier to which a potential at a connection point between the second detection resistor and the third detection resistor and the reference voltage are input, and outputs the second control signal.

According to this configuration, the step-up and -down converter having the first configuration first operates as a step-down converter to adjust the supply voltage to the first preset value when the output voltage Ei of the battery is higher than the first preset value Eoh. Then, when the output voltage Ei of the battery is decreased and becomes below the first preset value Eoh (higher than the second preset value Eol), the step-up and -down converter stops either the step-down operation or the step-up operation and operates in the through mode. When the output voltage Ei of the battery is decreased further and becomes below the second preset value Eol, the step-up and -down converter operates as a step-up converter to adjust the supply voltage to the second preset value.

Thus, when the difference between the output voltage Ei of the battery and the supply voltage Eo to the load is within a predetermined range (<(Eoh−Eol)), either the step-down operation or the step-up operation are stopped, and operation is performed in the through mode. Therefore, the loss in the step-up and -down converter can be reduced, and the use time of the battery can be prolonged.

In the first battery-driven electronic device, it is preferable that when a difference between the supply voltage to the load and the output voltage of the battery is within a predetermined range, the step-up and -down converter has a function to short-circuit some or all components interposed between its input and its output, because the loss in the step-up and -down converter can be reduced further, and the use time of the battery can be prolonged further.

In this case, a step-up and -down converter having a second configuration includes first switching means whose one end is connected to one end of the battery; first rectification switching means whose one end is connected to the other end of the first switching means, and whose other end is connected to the other end of the battery; an inductor whose one end is connected to the other end of the first switching means; second switching means whose one end is connected to the other end of the inductor, and whose other end is connected to the other end of the battery; third switching means whose one end is connected to one end of the first switching means, and whose other end is connected to the other end of the inductor; second rectification switching means whose one end is connected to one end of the second switching means, and whose other end is connected to one end of the load; an output capacitor whose one end is connected to one end of the load, and whose other end is connected to the other end of the battery and the other end of the load and that supplies a voltage to the load; a detecting circuit that detects the supply voltage at the output capacitor, outputs an error signal between the detected supply voltage and a first preset value for performing the step-down operation mode as a first control signal, and outputs an error signal between the detected supply voltage and a second preset value for performing the step-up operation mode as a second control signal; a first control driving circuit that controls the first switching means to be on/off so that the supply voltage is adjusted to the first preset value in accordance with the first control signal; a second control driving circuit that controls the second switching means to be on/off so that the supply voltage is adjusted to the second preset value in accordance with the second control signal, and a third control driving circuit that turns the third switching means on, when the first control signal is in a level that fixes the first switching means to be on, and the second control signal is in a level that fixes the second switching means to be off.

According to this configuration, in addition to the advantages provided by the step-up and -down converter having the first configuration, the loss can be reduced more than in the step-up and -down converter having the first configuration, and the use time of the battery can be prolonged further, because the inductor having a large DC resistance component, which constitutes a loss, can be short-circuited by turning the third switching means on.

In the first battery-driven electronic device, it is preferable that a step-up and -down converter having a third configuration includes first switching means whose one end is connected to one end of the battery; first rectification switching means whose one end is connected to the other end of the first switching means, and whose other end is connected to the other end of the battery; an inductor whose one end is connected to the other end of the first switching means; second switching means whose one end is connected to the other end of the inductor, and whose other end is connected to the other end of the battery; second rectification switching means whose one end is connected to one end of the second switching means, and whose other end is connected to one end of the load; third switching means whose one end is connected to one end of the inductor, and whose other end is connected to the other end of the second rectification switching means; an output capacitor whose one end is connected to one end of the load, and whose other end is connected to the other end of the battery and the other end of the load and that supplies a voltage to the load; a detecting circuit that detects the supply voltage at the output capacitor, outputs an error signal between the detected supply voltage and a first preset value for performing the step-down operation mode as a first control signal, and outputs an error signal between the detected supply voltage and a second preset value for performing the step-up operation mode as a second control signal; a first control driving circuit that controls the first switching means to be on/off so that the supply voltage is adjusted to the first preset value in accordance with the first control signal; a second control driving circuit that controls the second switching means to be on/off so that the supply voltage is adjusted to the second preset value in accordance with the second control signal, and a third control driving circuit that turns the third switching means on, when the first control signal is in a level that fixes the first switching means to be on, and the second control signal is in a level that fixes the second switching means to be off.

According to this configuration, in addition to the advantages provided by the step-up and -down converter having the first configuration, the loss can be reduced more than in the step-up and -down converter having the first configuration, and the use time of the battery can be prolonged further, because the inductor having a large DC resistance component, which constitutes a loss, can be short-circuited by turning the third switching means on.

In the second battery-driven electronic device, it is preferable that a step-up and -down converter having a fourth configuration includes a first inductor whose one end is connected to one end of the battery; switching means whose one end is connected to the other end of the first inductor and whose other end is connected to the other end of the battery; a coupling capacitor whose one end is connected to the other end of the first inductor; a second inductor whose one end is connected to the other end of the coupling capacitor and whose other end is connected to the other end of the battery; rectification switching means whose one end is connected to one end of the second inductor, and whose other end is connected to one end of the load; an output capacitor whose one end is connected to one end of the load, and whose other end is connected to the other end of the battery and the other end of the load and that supplies a voltage to the load; and control driving means that controls the switching means to be on/off in order to adjust the supply voltage to a predetermined value required to be supplied to the load.

According to this configuration, the ripple component of the input current can be reduced, that is, sharp variations in the discharge current of the battery can be reduced. Therefore, the characteristics of the battery can be prevented from deteriorating, the lifetime can be prevented from being short, and the use time of the battery can be prolonged.

In the first battery-driven electronic device, it is preferable that a step-up and -down converter having a fifth configuration includes a first inductor whose one end is connected to one end of the battery; switching means whose one end is connected to the other end of the first inductor, and whose other end is connected to the other end of the battery; first rectification switching means whose one end is connected to the other end of the first inductor; a first capacitor whose one end is connected to the other end of the first rectification switching means, and whose other end is connected to the other end of the battery; second switching means whose one end is connected to the other end of the first rectification switching means; second rectification switching means whose one end is connected to the other end of the second switching means, and whose other end is connected to the other end of the battery; a second inductor whose one end is connected to one end of the second rectification switching means, and whose other end is connected to one end of the load; a second capacitor whose one end is connected to one end of the load, and whose other end is connected to the other end of the battery and the other end of the load and that supplies a voltage to the load; a first detecting circuit that detects an intermediate voltage (E1) at the first capacitor, and outputs an error signal between the detected intermediate voltage and an intermediate voltage preset value for performing the step-up operation mode as a first control signal; and a second detecting circuit that detects the supply voltage (Eo) at the second capacitor, and outputs an error signal between the detected supply voltage and a supply voltage preset value for performing the step-down operation mode as a second control signal; a first control driving circuit that controls the first switching means to be on/off so that the intermediate voltage at the first capacitor is adjusted to the intermediate voltage preset value in accordance with the first control signal; a second control driving circuit that controls the second switching means to be on/off so that the supply voltage at the second capacitor is adjusted to the supply voltage preset value in accordance with the second control signal.

According to this configuration, unlike the step-up and -down converters having the first to the fourth configuration, with the configuration in which the step-up converter is in the front stage and the step-down converter is in the rear stage, output current is continuous in the step-down converter in the rear stage. Therefore, both a reduction of ripple voltage and a reduction of the capacitance of the second capacitor can be achieved. Thus, the present invention can be adapted to an application requiring the supply voltage to be changed significantly in a short time.

In this case, it is preferable that the intermediate voltage preset value is set to a value obtained by adding a maximum voltage required by the load to a value obtained by multiplying a resistance component between the first capacitor and the second capacitor by a maximum current required by the load.

Thus, the step-down converter in the rear stage can operate with such a good efficiency that the second switching means is constantly on, when the load requires the maximum voltage and the maximum current.

BEST MODE FOR CARRYING OUT THE INVENTION

Hereinafter, embodiments of the present invention will be described with reference to the drawings.

First Embodiment

Figure 1:
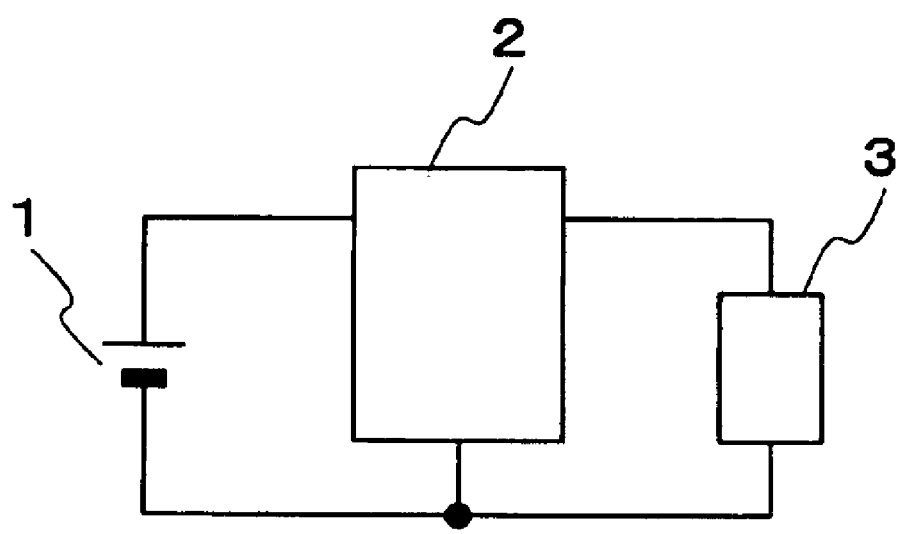
FIG. 1 is a circuit block diagram showing a schematic configuration of a battery-driven electronic device according to a first embodiment of the present invention.

FIG. 1 is a circuit block diagram showing a schematic configuration of a battery-driven electronic device according to a first embodiment of the present invention. In FIG. 1, reference numeral 1 denotes a battery employing lithium cobaltate as the positive electrode, graphite as the negative electrode, and a nonaqueous solvent containing lithium supporting electrolyte as the electrolyte and having discharge characteristics that are sloped over time with a battery voltage change ratio of 0.25 or more, as opposed to the conventional lithium ion battery having an average battery voltage of 3.7 V at room temperature as the discharge characteristics. Herein, the "battery voltage change ratio" refers to a value obtained by dividing a voltage difference (Ec−Ed) by Ec, where Ec is the open circuit voltage after the rated charge end voltage is reached, and Ed is the open circuit voltage after the rated discharge end voltage is reached.

Reference numeral 2 denotes a step-up and -down converter using the battery 1 as its input source, and reference numeral 3 denotes a load to which the output voltage of the step-up and -down converter 2 is input.

Figure 2:
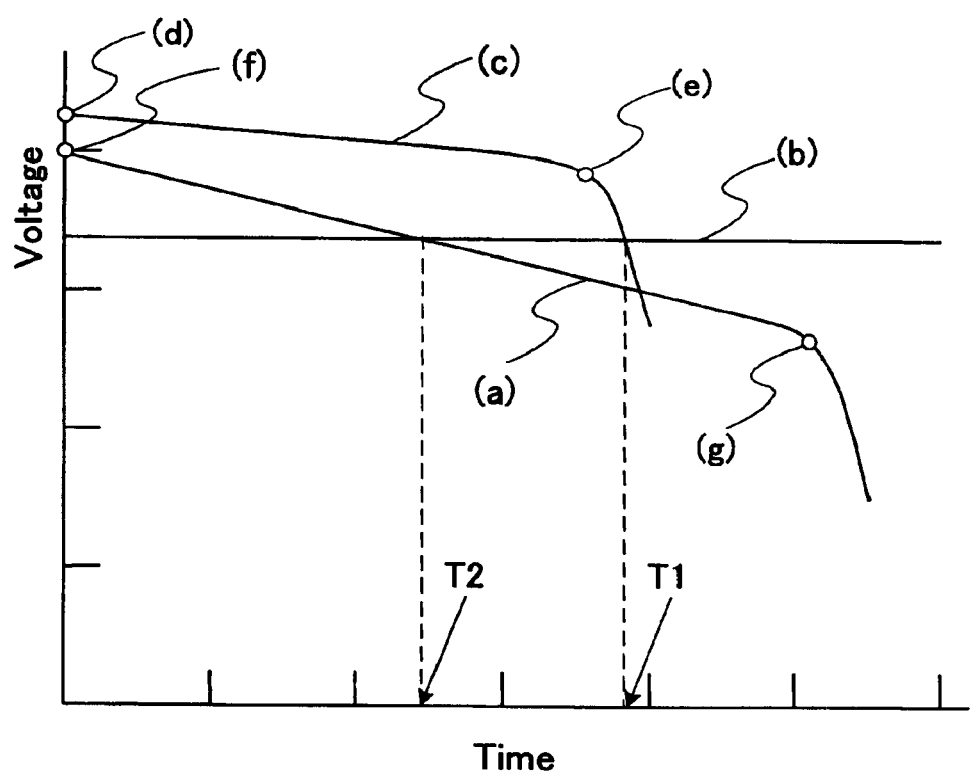
FIG. 2 is a diagram showing the discharge characteristics of a battery and the voltage supplied to a load in the first embodiment of the present invention.

FIG. 2 shows the typical discharge characteristics (a) of the battery 1 and the voltage (b) required to be supplied to the load 3 and also shows the discharge characteristics (c) of the conventional lithium ion battery for comparison.

Figure 4:
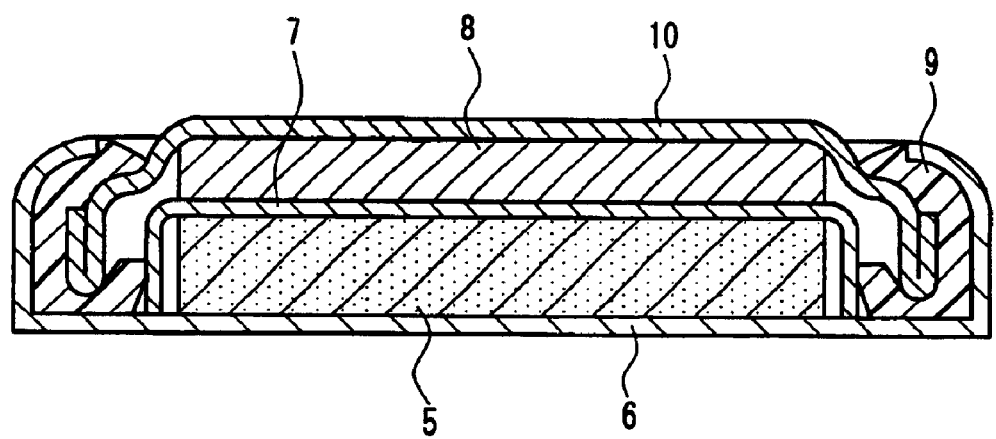
FIG. 4 is a cross-sectional view showing the structure of a coin-type battery for evaluation in the first embodiment of the present invention.

FIG. 4 is a cross-sectional view showing the structure of a coin-type cell for evaluation that is produced as the battery 1. FIG. 4 will be described.

First, 7.5 g of negative electrode powder 2 g of graphite powder as a conducting agent, and 0.5 g of polyethylene powder as a binding agent were mixed to produce a negative electrode mixture. Then, 7.5 g of positive electrode powder, 2 g of a conducting agent, and 0.5 g of polyvinylidene fluoride as a binding agent were mixed to produce a positive electrode mixture. Then, 0.1 g of the mixture was molded by pressing into an electrode 5 with a diameter of 17.5 mm and the electrode was placed in a case 6. Then, a microporous polypropylene separator 7 was placed on the electrode 5. A counter electrode 8 for a test was spaced apart from the electrode 5 by the microporous polypropylene separator 7. For the counter electrode 8 for a test, specifically, metallic lithium is used.

A mixed solution of ethylene carbonate (EC) and diethyl carbonate (DEC) at a volume ratio of 1:1 in which 1.5 mol/liter of a supporting salt $LiPF_6$ were dissolved was poured into the coin-type cell for evaluation as a nonaqueous electrolyte. On top of that, a sealing plate 10 to which metallic lithium with a diameter of 17.5 mm is attached on its inner face and a polypropylene gasket 9 is attached on its outer circumference was placed for sealing and thus a test cell was produced.

For evaluation of the negative electrode mixture with this coin-type cell for evaluation, constant current charge (a reaction in which lithium is inserted in an active material) was performed at a constant current of 0.5 mA/cm² until the terminal voltage reached 0 V, and subsequently discharge (a reaction in which lithium is released from an active material) was performed at a current density of 0.5 mA/cm² until the battery voltage reached 1.5 V, and thus a charge/discharge curve was obtained. For evaluation of the positive electrode mixture, constant current charge (a reaction in which lithium is released from an active material) was performed at a constant current of 0.5 mA/cm$^2$ until the terminal voltage reached 4.25 V, and subsequently discharge (a reaction in which lithium is inserted in an active material) was performed at a current density of 0.5 mA/cm$^2$ until the battery voltage reached 3.0 V, and thus a charge/discharge curve was obtained in the same manner. Using these, the time average of the discharge voltage, the average discharge potential, and the characteristics shape or the capacity of the positive electrode and the negative electrode were measured. Tables 1, 2, 3, and 4 show the results of measurement of the battery discharge average voltage of various materials with these coin-type cells for evaluation.

TABLE 1

| Positive electrode | | Negative electrode | | battery |
|---|---|---|---|---|
| active material | discharge average potential (vs Li) | active material composition | discharge average potential (vs Li) | discharge average voltage (V) |
| LiNiO2 | 3.7 | CoSn | 0.4 | 3.3 |
| | | CoSn2 | | |
| | | MnSn | | |
| | | Mn2Sn | | |
| | | Mn2Sn3 | | |
| | | Ti3Sn2 | | |
| | | TiSn | | |
| | | Ti6Sn5 | | |
| | | Ti2Sn | | |
| | | Ti1.8Sn | | |
| | | Cu3Sn2 | | |
| | | CuSn | | |
| | | TiSi | | |
| | | Ti2Si | | |
| | | Fe3Si2 | | |
| | | CoSi | | |
| | | Co3Si2 | | |
| | | Co2Si | | |
| | | NiSi | | |
| | | Ni2Si | | |
| | | Fe2Si | | |

TABLE 2

| Positive electrode | | Negative electrode | | battery |
|---|---|---|---|---|
| active material | discharge average potential (vs Li) | active material composition | discharge average potential (vs Li) | discharge average voltage (V) |
| LiCoO2 | 3.8 | CoSn | 0.4 | 3.4 |
| | | CoSn2 | | |
| | | MnSn | | |
| | | Mn2Sn | | |
| | | Mn2Sn3 | | |
| | | Ti3Sn2 | | |
| | | TiSn | | |
| | | Ti6Sn5 | | |
| | | Ti2Sn | | |
| | | Ti1.8Sn | | |
| | | Cu3Sn2 | | |
| | | CuSn | | |
| | | TiSi | | |
| | | Ti2Si | | |
| | | Fe3Si2 | | |
| | | CoSi | | |
| | | Co3Si2 | | |
| | | Co2Si | | |
| | | NiSi | | |
| | | Ni2Si | | |
| | | Fe2Si | | |

TABLE 3

| Positive electrode | | Negative electrode | | battery |
|---|---|---|---|---|
| active material | discharge average potential (vs Li) | active material composition | discharge average potential (vs Li) | discharge average voltage (V) |
| LiMn2O4 | 3.85 | CoSn | 0.4 | 3.45 |
| | | CoSn2 | | |
| | | MnSn | | |
| | | Mn2Sn | | |
| | | Mn2Sn3 | | |
| | | Ti3Sn2 | | |
| | | TiSn | | |
| | | Ti6Sn5 | | |
| | | Ti2Sn | | |
| | | Ti1.8Sn | | |
| | | Cu3Sn2 | | |
| | | CuSn | | |
| | | TiSi | | |
| | | Ti2Si | | |
| | | Fe3Si2 | | |
| | | CoSi | | |
| | | Co3Si2 | | |
| | | Co2Si | | |
| | | NiSi | | |
| | | Ni2Si | | |
| | | Fe2Si | | |

TABLE 4

| Positive electrode | | Negative electrode | | battery |
|---|---|---|---|---|
| active material | discharge average potential (vs Li) | active material composition | discharge average potential (vs Li) | discharge average voltage (V) |
| sulfur | 2.2 | Li | 0 | 2.2 |
| sulfur based organic compound with a thiol group or a thiolate group | 3.4 | Li | 0 | 3.4 |
| sulfur based organic compound with a thiol group or a thiolate group | 3.4 | Li2.6Co0.4N | 0.8 | 2.6 |
| LixMn2O4 | 3.85 | Li2.6Co0.4N | 0.8 | 3.05 |
| LixNiO2 | 3.7 | Li2.6Co0.4N | 0.8 | 2.9 |
| LixCoO2 | 3.8 | Li2.6Co0.4N | 0.8 | 3 |

Cylindrical batteries were produced as test products, using materials selected from these materials. This production method will be described.

As the active material for the positive electrode, $LiNiO_2$, $LiCoO_2$ and $LiMn_2O_4$, which were positive active materials based on oxides, were examined.

$LiNiO_2$ was synthesized by mixing LiOH and $Ni(OH)_2$ in a predetermined mole ratio and heating the mixture in the air at a temperature of 900° C., and those classified to 100 mesh or smaller were used. $LiCoO_2$ was synthesized by mixing $Li_2CO_3$ and $Co(OH)_2$ in a predetermined mole ratio and heating the mixture in the air at a temperature of 800° C., and those classified to 100 mesh or smaller were used. $LiMn_2O_4$ was synthesized by mixing $Li_2CO_3$ and $MnO_2$ in a predetermined mole ratio and heating the mixture in the air at a temperature of 800° C., and those classified to 100 meshes or smaller were used.

A paste for a positive electrode was produced by adding 10 g of acetylene black as a conducting agent, 8 g of polyvinylidene fluoride as a binding agent to 100 g of the positive active material and adding N,N-dimethylformamide as a solvent thereto and mixing them sufficiently. This paste for a positive electrode was applied onto a core material of aluminum, dried and rolled, and thus a positive electrode 11 shown in FIG. 5 was obtained.

On the other hand, when using a nonoxide-based positive electrode, an aluminum foil coated with ink in which an organic compound having sulfur or a thiol or thiolate group was dissolved in an organic solvent and dried was used.

As negative active materials, multicomponent alloys and metal nitrides were examined. Powdered active materials obtained by pulverizing these active materials, acetylene black as a conducting agent, and styrene butadiene rubber (SBR) as a binding agent were mixed at a weight ratio of 70:20:10, and were made into a paste, using N,N-dimethylformamide. This paste was applied onto a core material made of copper and then dried, and thus a negative electrode 12 shown in FIG. 5 was obtained. In the case of metallic lithium, a foil was attached to a copper core material to produce a negative electrode.

Figure 5:
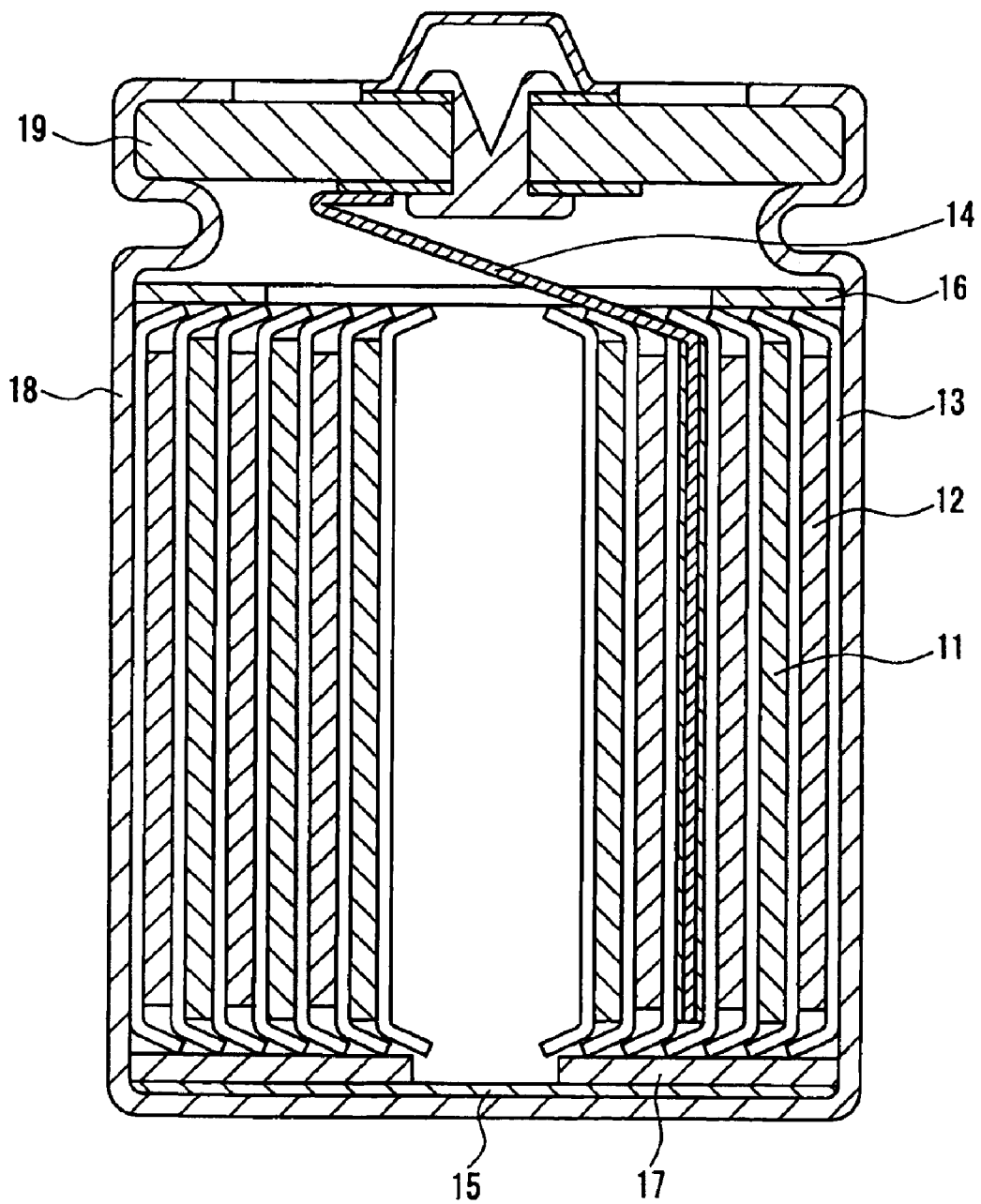
FIG. 5 is a cross-sectional view showing the structure of a cylindrical battery in the first embodiment of the present invention.

The procedure for producing a cylindrical battery will be described with reference to FIG. 5. A positive lead 14 made of aluminum was attached to aluminum as a positive core material by ultrasonic welding. In the same manner, a negative lead 15 made of the same material was joined to copper as a negative core material by laser spot welding. The entire structure including the positive electrode, the negative electrode and the porous polypropylene separator 13 in the form of a band having a wider width than those of the two electrodes that was interposed therebetween was curled in a coil form. Furthermore, polypropylene insulating plates 16 and 17 are disposed on the upper and the lower electrodes, respectively, and the whole structure was inserted into a battery case 18. Then, a step portion was formed in the upper portion of the battery case 18, and then a mixed solution of EC and DMC with the same volumes in which 1.5 mole/liter of $LiPF_6$ was dissolved was poured as a nonaqueous electrolyte. Then, the battery case was sealed with a sealing plate 19 and thus a battery was obtained.

As opposed to the thus produced cylindrical battery, a comparative battery employing an oxide-based positive electrode and a graphite-based negative electrode was subjected to constant current charging to 4.2 V at an environment temperature of 20° C. and a charge current of 0.2 CmA (1 C is one hour rate current). Similarly, batteries employing an oxide-based positive electrode and an alloy-based negative electrode or a nitride-based negative electrode were charged to 4.0 V or 3.8 V, respectively. Moreover, batteries employing an organic positive electrode having a thiol or thiolate group containing sulfur and a nitride-based negative electrode or a metallic lithium negative electrode were charged to 3.6 V or 4.0 V, respectively. At the first discharge, the comparative battery employing an oxide-based positive electrode and a graphite-based negative electrode was discharged to 3.0 V at a current of 0.2 CmA. Similarly, all the batteries used in the examples were discharged to 1.5 V. After charging was performed again under the above conditions, discharge was performed to a predetermined voltage at a discharge current with a current density of 2 CmA. The battery voltage, the discharge shape, the discharge capacity and the like of the battery systems obtained by combining various positive and negative active materials with this cylindrical battery were measured.

Figure 6:
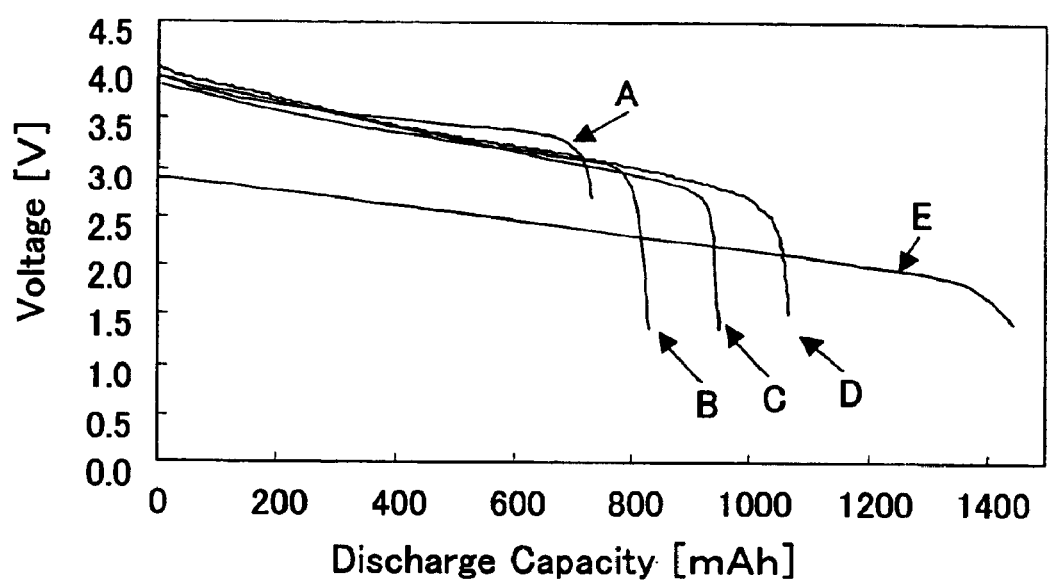
FIG. 6 is a graph showing the discharge characteristics in combinations of various active materials in the first embodiment of the present invention.

FIG. 6 shows the discharge characteristics of the combinations of various active materials, using the thus obtained cylindrical batteries. A battery A exhibits the characteristics of a battery having a relatively high voltage that employs an oxide-based positive electrode and a graphite-based negative electrode. Batteries B, C and D exhibit the characteristics of batteries that employ an oxide-based positive electrode and an alloy-based negative electrode or a nitride-based negative electrode. A battery E exhibits the characteristics of a battery that employ an organic positive electrode having a thiolate or thiol group containing sulfur and a nitride-based negative electrode.

Figure 7:
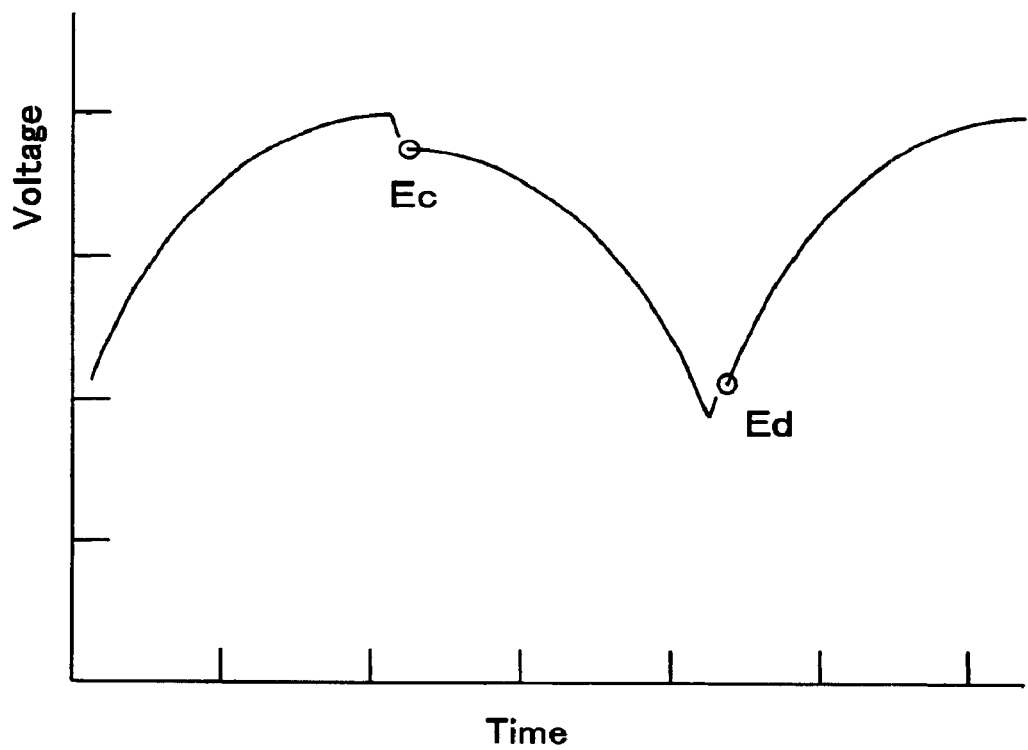
FIG. 7 is a graph showing a change of the battery voltage with respect to the time due to charge and discharge of the battery in the first embodiment of the present invention.

In general, since the open circuit state after charging/discharging changes in the course in which the positive and negative active materials are changed to the equilibrium potential, a voltage drop is seen on the side of charging and a voltage build-up is seen on the side of discharging, regardless of the preset rated end voltage for charging/discharging. When calculating the battery voltage change ratio (Ec−Ed)/Ec, which is a value obtained by dividing the voltage difference (Ec−Ed) by the open circuit voltage Ec, where Ec is the open circuit voltage after the rated charge end voltage is reached, and Ed is the open circuit voltage after the rated discharge end voltage is reached, as shown in FIG. 7, for example, for the battery A, the battery voltage change ratio is 0.21, and it is 0.35 for the battery E.

From these results, materials having a large discharge capacity tend to have a large battery voltage change ratio, that is, tend to have discharge characteristics that are sloped over time. In the present invention, the batteries having discharge characteristics of a battery voltage change ratio of 0.25 or more is used. The batteries of these materials tend to have a low average battery voltage.

Figure 3:
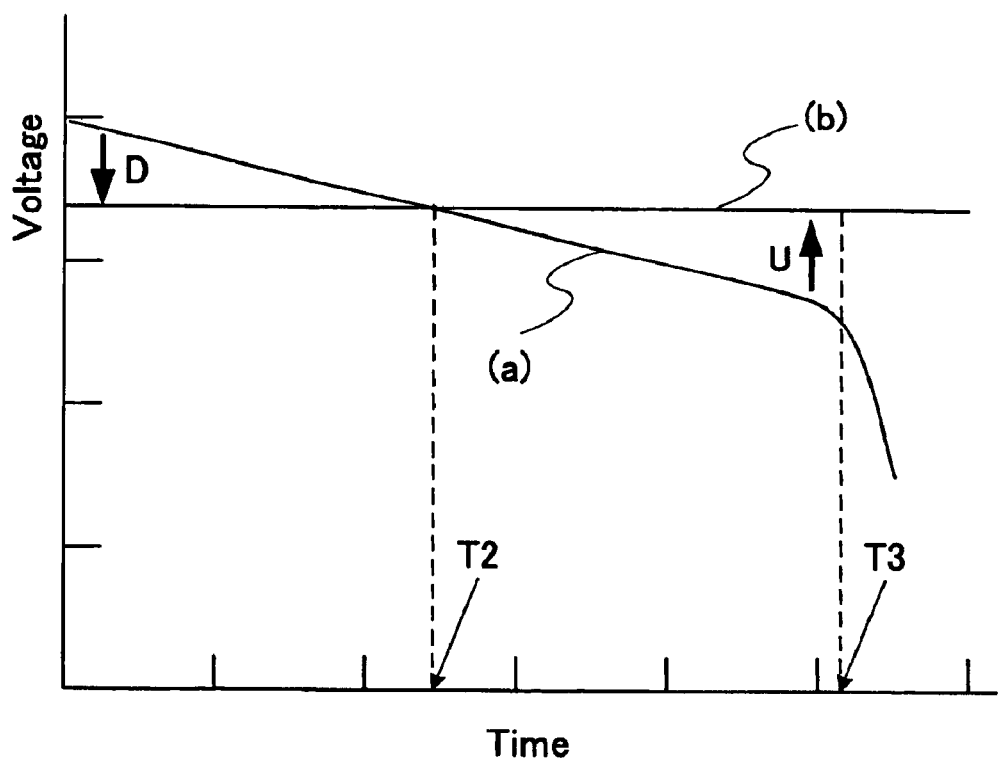
FIG. 3 is a diagram showing the manner in which the operation is shifted from the operation of lowering the voltage (arrow D) to the operation of raising the voltage (arrow U) in the magnitude correlation between the discharge characteristics of the battery and the voltage supplied to the load in the first embodiment of the present invention.

The battery-driven electronic device of this embodiment having the above structure will be described with reference to FIGS. 1, 2 and 3.

The lithium ion battery made of a new material having the discharge characteristics that the battery voltage change ratio is 0.25 or more used for the battery 1, which is a component of the present invention, has a large discharge capacity, that is, can have a high energy density per unit volume or unit weight. On the other hand, as shown in FIG. 2, compared with the discharge characteristics (c) of the conventional lithium ion battery, the lithium ion battery has the characteristics (a) that the discharge characteristics of the battery are sloped over time, that is, the battery voltage is decreased with discharging, and that the average battery voltage is low. (d) denotes the rated charge end voltage of the conventional lithium ion battery, (e) denotes its discharge last state voltage, (f) is the rated charge end voltage of the lithium ion battery made of a new material, and (g) denotes its discharge last state voltage. In other words, (d)–(e) is a voltage decrease due to the discharge of the conventional lithium ion battery, and (f)–(g) is a voltage decrease due to the discharge of the lithium ion battery made of a new material. This voltage decrease amount of the lithium ion battery made of a new material is larger, and the absolute level thereof is smaller. Therefore, in a battery-driven electronic device having the conventional configuration, the battery voltage becomes below the voltage (b) required to be supplied to the load 3 at an earlier time (T2) than the use time (T1) of the discharge characteristics (c) of the conventional lithium ion battery.

If the circuit configuration is such that the output voltage of this battery 1 is input to the step-up and -down converter 2, an operation can be performed as follows. As shown in FIG. 3, when the discharge characteristics (a) of the battery 1 are higher than the voltage (b) required to be supplied to the load 3, the step-up and -down converter 2 operates so as to lower the voltage (indicated by an arrow D), and when the discharge characteristics (a) of the battery 1 become below the voltage (b) required to be supplied to the load 3, the step-up and -down converter 2 operates so as to raise the voltage (indicated by an arrow U). Thus, the use time (T3) that is significantly longer than the use time (T2) for the case in which the step-up and -down converter 2 is not incorporated and that exceeds the use time (T1) of the conventional lithium ion battery can be realized, and thus the large discharge capacity of the battery 1, that is, the energy accumulated in the battery can be utilized effectively, so that a long term use can be attained.

Herein, 3 V, 100 mA, and a consumption power of 0.3 W are assumed for the load. In the case of a battery-driven electronic device having the conventional configuration in which the conventional lithium ion battery employing lithium cobaltate as the positive electrode, carbon as the negative electrode and a nonaqueous solvent containing lithium supporting electrolyte as the electrolyte and having an average battery voltage of 3.7 V and a discharge capacity of 800 mAh at room temperature is combined with a step-down converter, the battery use time is 8 hours.

On the other hand, in this embodiment in which the lithium ion battery made of a new material employing $LiNiO_2$ as the positive active material, $Ti_6Sn_5$ as the negative active material and having an average battery voltage of 3.3 V and a discharge capacity of 1100 mAh at room temperature is combined with a step-up and -down converter, the battery use time is 10 hours, which is two hours longer.

Second Embodiment

Figure 8:
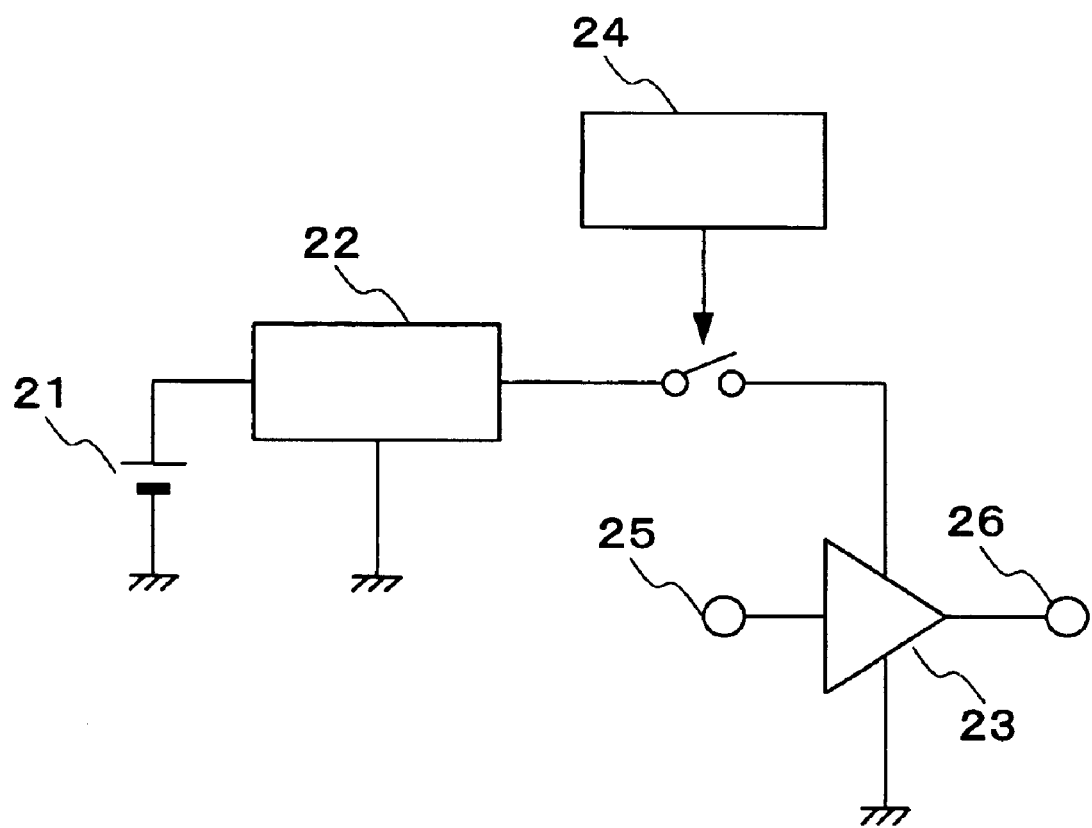
FIG. 8 is a partial configuration diagram of mobile communications equipment of the PDC system in which a battery-driven electronic device according to a second embodiment of the present invention is mounted.

FIG. 8 is a diagram showing the configuration of a battery-driven electronic device and mobile communications equipment according to a second embodiment of the present invention. This embodiment is configured such that the load includes a power amplifier for wireless transmission that sends a burst-like signal as in the time-division multiplex system. In FIG. 8, reference numeral 21 denotes a battery having the profile that the power density is higher than that of a battery having a commonly used composition, but the discharge characteristics are sloped over time. Reference numeral 22 denotes a step-up and -down converter using the battery 21 as the input. Reference numeral 23 denotes a power amplifier to which the output voltage of the step-up and -down converter is input. Reference numeral 25 denotes an input terminal of the power amplifier 23, and reference numeral 26 denotes an output terminal of the power amplifier 23. Reference numeral 24 denotes controlling means for performing control such that the output voltage of the step-up and -down converter 22 is supplied to the power amplifier 23 during a period in which the power amplifier 23 operates to amplify a transmission signal.

Hereinafter, the operation of the battery-driven electronic device and the mobile communications equipment of this embodiment will be described.

The power amplifier 23 sends out a burst-like signal, so that the controlling means 24 supplies power only at the time of sending out signals of the power amplifier 23 for power saving purposes. The power amplifier 23 amplifies the power of the signals input from the input terminal 25 and outputs the amplified signals. A supply voltage of at least a certain level is necessary in the power amplifier 23 for this power amplification. On the other hand, when the voltage is supplied more than necessary, the power loss in the power amplifier 23 is increased. For example, the configuration has been as follows. The supply voltage necessary for a power amplifier of the PDC (Personal Digital Cellular) system is 3 V, and the output voltage of the conventional lithium ion battery having an average battery voltage of 3.7 V and a discharge capacity of 800 mAh and employing lithium cobaltate as the positive electrode, carbon as the negative electrode and a nonaqueous solvent containing a lithium supporting electrolyte as the electrolyte is input directly to the power amplifier. However, in the context in which the power consumption of a portable telephone having an increasing number of functions tends to increase, it is necessary to increase the capacity of the battery in order to increase the use time of the portable telephone, as described above.

Therefore, as the configuration of the battery-driven electronic device and the mobile communications equipment of this embodiment shown in FIG. 8, if the lithium ion battery made of a new material 21 employing $LiNiO_2$ as the positive active material, $Ti_6Sn_5$ as the negative active material and having an average battery voltage of 3.3 V and a discharge capacity of 1100 mAh is combined with a step-up and -down converter 22, when the voltage of the battery 21 is higher than the supply voltage of the power amplifier 23, the step-up and -down converter 22 supplies a necessary voltage to the power amplifier 23 by an operation of lowering the voltage, so that the efficiency of the power amplifier 23 becomes better. When the voltage of the battery 21 is lower than the supply voltage of the power amplifier 23, the step-up and -down converter 22 converts to a necessary voltage for the power amplifier 23 by an operation of raising the voltage, so that the energy of the battery 21 can be utilized effectively, and a long term use can be attained.

Third Embodiment

Figure 9:
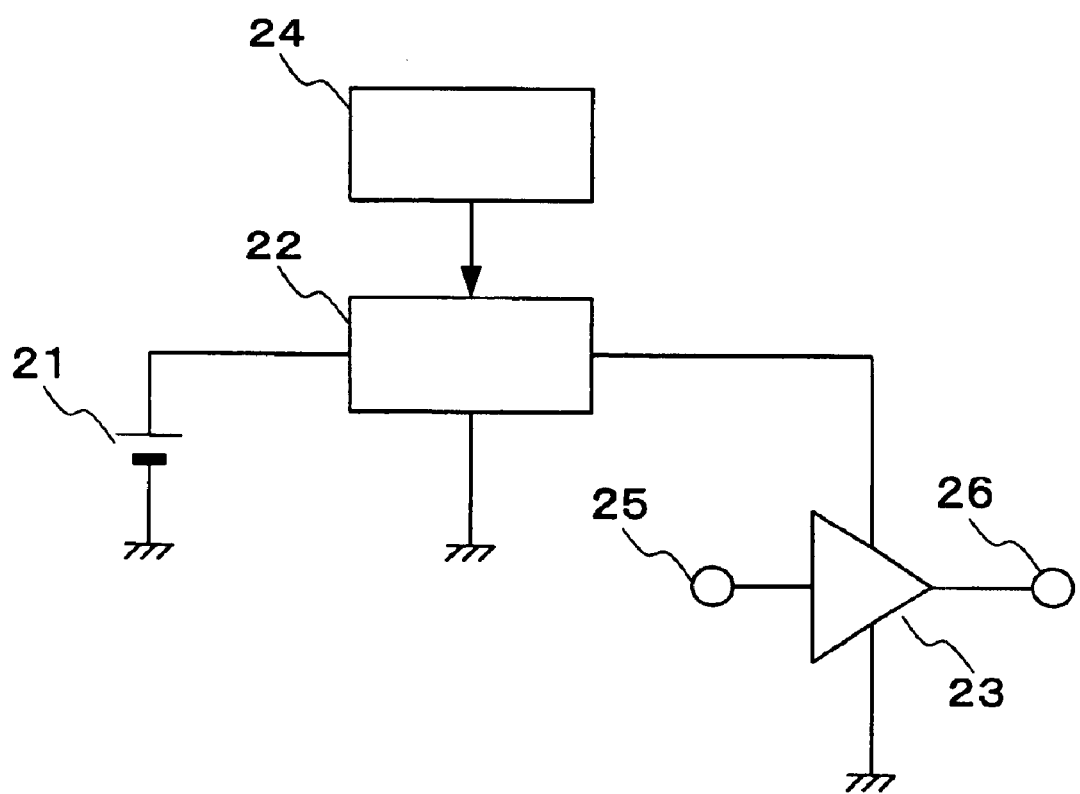
FIG. 9 is a partial configuration diagram of mobile communications equipment of the CDMA system in which a battery-driven electronic device according to a third embodiment of the present invention is mounted.

FIG. 9 is a configuration diagram of a battery-driven electronic device and mobile communications equipment according to a third embodiment of the present invention. This embodiment is configured such that the load includes a power amplifier for wireless transmission of the CDMA (Code Division Multiple Access) system. In FIG. 9, reference numeral 21 denotes a battery having a profile that the power density is higher than that of a battery having a commonly used composition, but the discharge characteristics are sloped over time. Reference numeral 22 denotes a step-up and -down converter to which the output voltage of the battery 21 is input, and reference numeral 23 denotes a power amplifier using the output voltage of the step-up and -down converter as the supply voltage. Reference numeral 25 denotes an input terminal of the power amplifier 23, and reference numeral 26 denotes an output terminal of the power amplifier 23. Reference numeral 24 denotes controlling means for controlling the output voltage of the step-up and -down converter 23.

The power amplifier 23 needs a supply voltage of at least a certain level, depending on the transmission power. On the other hand, if the supply voltage is too high, the power loss in the power amplifier 23 increases. That is to say, for power amplifier 23, there is a preferable supply voltage depending on the transmission power. The controlling means 24 has a function for controlling the supply voltage to the power amplifier 23 whose transmission power is varied in accordance with the use environment of the battery-driven electronic device of this embodiment such as the state of radio waves or the distance to the radio base station.

Hereinafter, the operation of the battery-driven electronic device and the mobile communications equipment of this embodiment will be described with reference to FIGS. 10, 11A and 11B.

Figure 10:
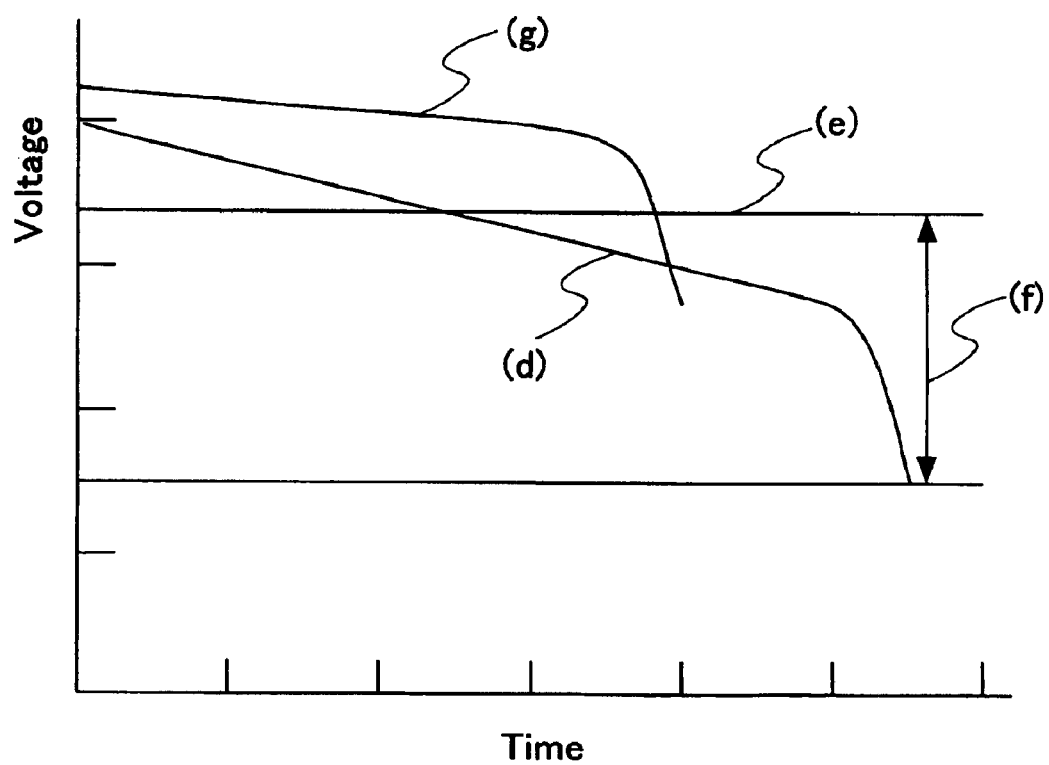
FIG. 10 is a diagram showing the discharge characteristics of the battery and the voltage range required by the load in the mobile communications equipment of FIG. 9.
Figure 11A:
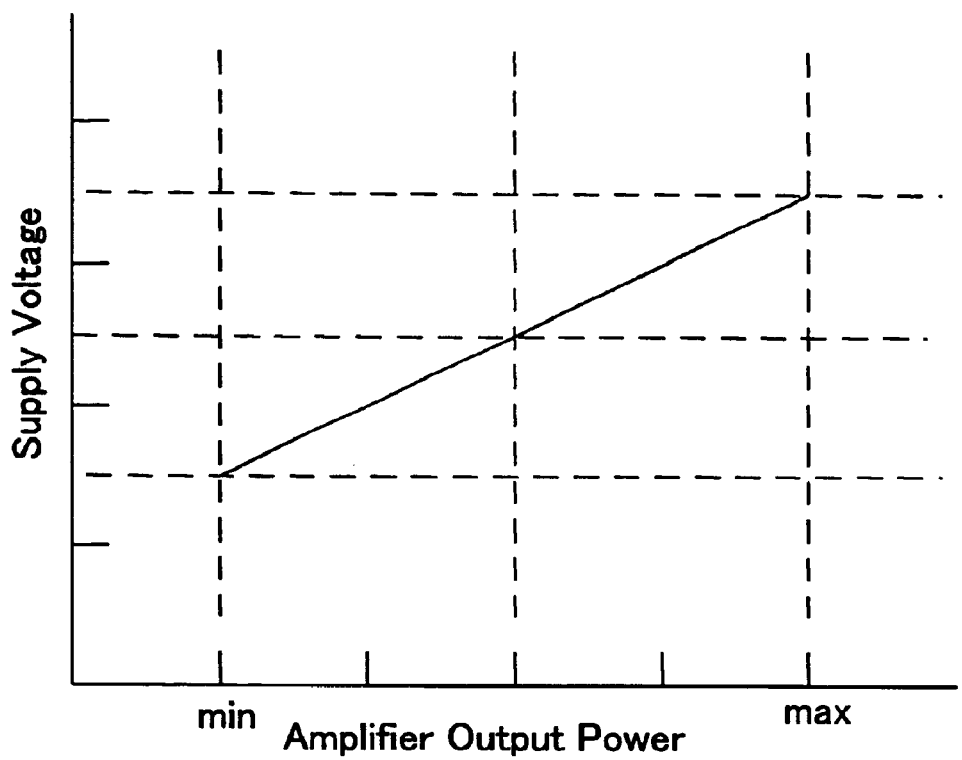
FIG. 11A is a diagram showing the relationship between the output power of the power amplifier and the supply voltage in the mobile communications equipment of FIG. 9.
Figure 11B:
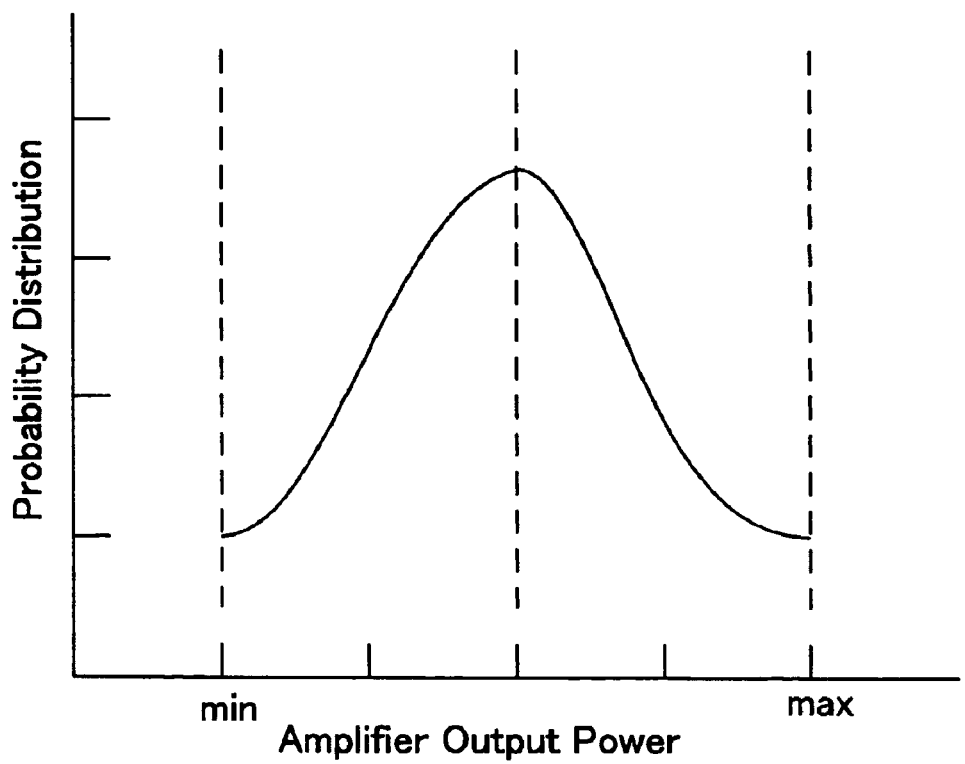
FIG. 11B is a diagram showing the output power of the power amplifier and its event probability in the mobile communications equipment of FIG. 9.

In FIG. 10, (d) shows the discharge characteristics of the battery 21 and (f) is a variable range of the supply voltage required by the load. (g) shows the general discharge characteristics of the conventional lithium ion battery for comparison. FIG. 11A is a characteristics diagram showing the relationship between the output power of the amplifier, which is the transmission power of the power amplifier 23, and the supply voltage required by the power amplifier 23. FIG. 11B is a diagram showing the output power of the amplifier, which is the transmission power of the power amplifier 23, and the event probability of the output power. As shown in FIG. 11B, the event probability is high substantially in the center, and as a result, for the supply voltage required by the power amplifier 23, the central voltage in the variation range is required most. For example, the variable range of the supply voltage of the power amplifier 23 of the CDMA system is about 1.5 V to 3.5 V.

The conventional configuration was such that the output voltage of the conventional lithium ion battery having an average battery voltage of 3.7 V and a discharge capacity of 800 mAh and employing lithium cobaltate as the positive electrode, carbon as the negative electrode and a nonaqueous solvent containing a lithium supporting electrolyte as the electrolyte as shown in the discharge characteristics (g) in FIG. 10 was input to the power amplifier via a step-down converter.

On the other hand, this embodiment is configured such that the lithium ion battery made of a new material 21 employing $LiNiO_2$ as the positive active material, $Ti_6Sn_5$ as the negative active material and having an average battery voltage of 3.3 V and a discharge capacity of 1100 mAh as shown in the discharge characteristics (d) in FIG. 10 is combined with the step-up and -down converter 22. Thus, the voltage change width of the battery 21 is large, and even if the variable range of the supply voltage of the power amplifier 23 is large, the step-up and -down converter 22 can be used both for the operation of lowering the voltage and the operation of raising the voltage, so that the energy of the battery 21 that has a larger capacity can be utilized effectively, and the battery 21 can be used for a longer time.

In general, for a converter, the larger the input and output voltage difference is, the poorer the conversion efficiency tends to be. According to this embodiment, since the output voltage of the battery 21 becomes close to the output voltage of the step-up and -down converter 22 applied to the power amplifier 23, the efficiency also is better.

Figure 12:
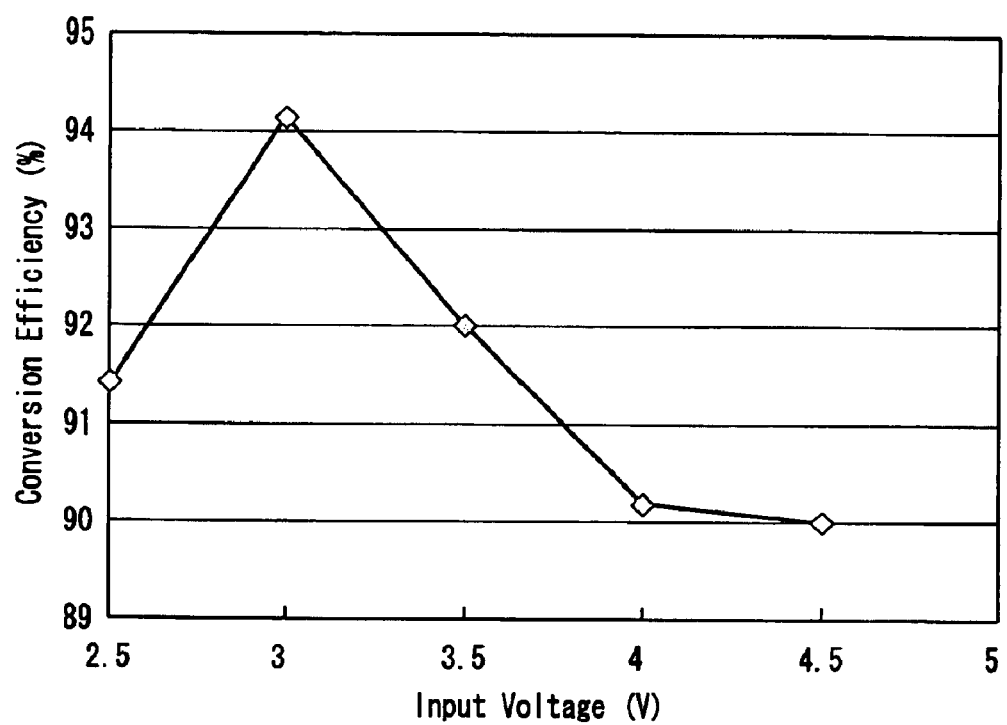
FIG. 12 is a characteristics diagram of the conversion efficiency with respect to the input voltage in the case where the output power of the step-up and -down converter is constant in the mobile communications equipment of FIG. 9.

FIG. 12 is a characteristics diagram of the conversion efficiency of the step-up and -down converter that is produced as a test product. FIG. 12 shows a change of the conversion efficiency when the output voltage is fixed to 3.5 V, the output current is fixed to 142 mA, and the input voltage is changed from 2.5 V to 5 V. As seen from the efficiency characteristics, when the input voltage is close to the output voltage, the efficiency of the step-up and -down converter is good.

Figure 13:
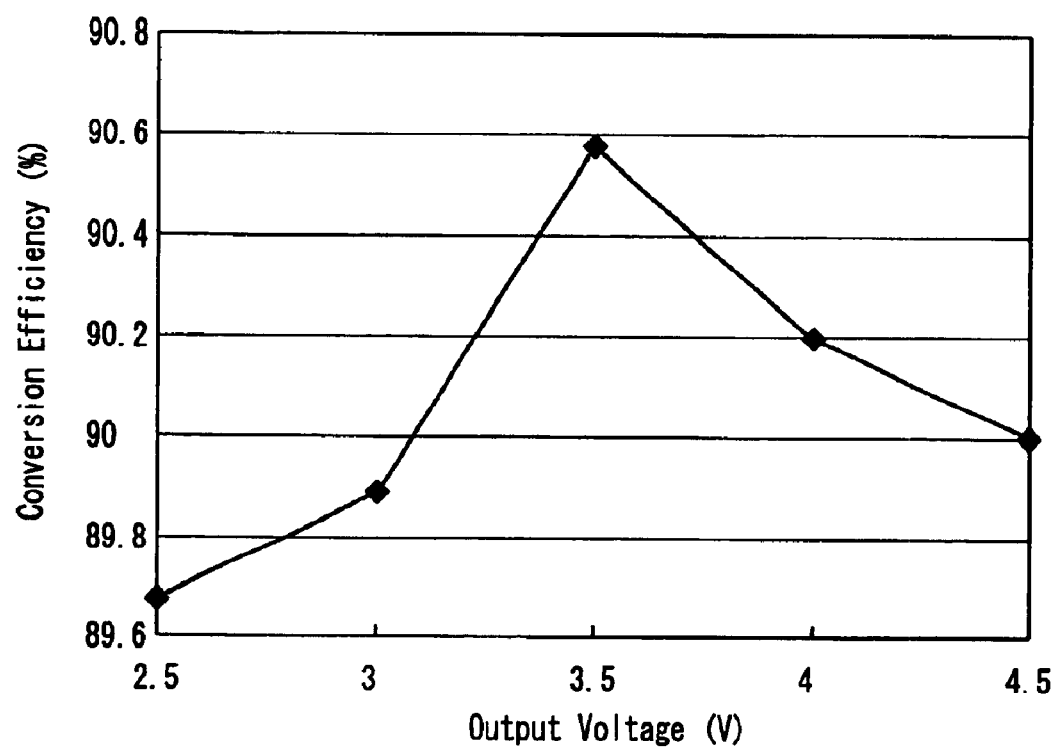
FIG. 13 is a characteristics diagram of the conversion efficiency with respect to the output voltage in the case where the input power of the step-up and -down converter is constant in the mobile communications equipment of FIG. 9.

FIG. 13 is a characteristics diagram of the conversion efficiency of the same step-up and -down converter when the input voltage is fixed to 3.5 V, the output power is fixed to 0.5 W, and the output voltage is changed from 2.5 V to 4.5 V. As seen from FIG. 13, when the difference between the input voltage and the output voltage is smaller, the efficiency is better. Furthermore, when the voltage difference between the input and the output of the step-up and -down converter 22 is within a predetermined voltage range, the battery 21 and the power amplifier 23 can be coupled directly, and therefore high efficiency can be attained. Thus, the battery use time can be prolonged.

Fourth Embodiment

Figure 14:
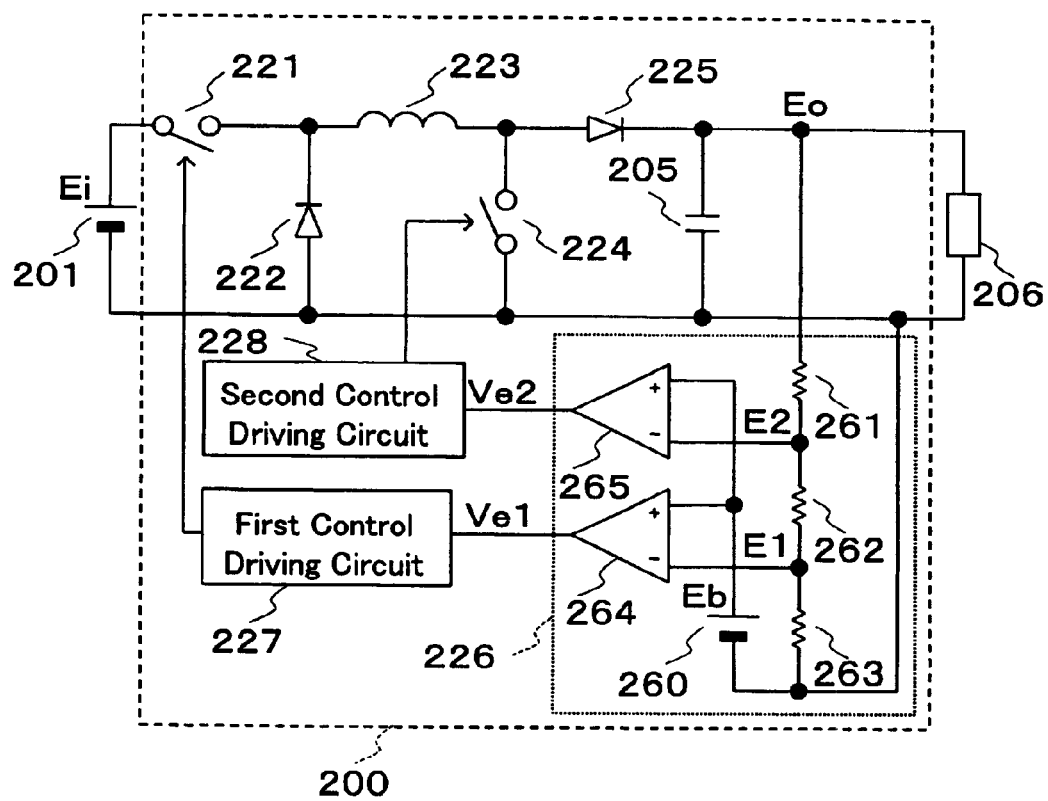
FIG. 14 is a circuit diagram showing the configuration of a battery-driven electronic device according to a fourth embodiment of the present invention.

FIG. 14 is a circuit diagram showing the configuration of a battery-driven electronic device according to a fourth embodiment of the present invention. As shown in FIG. 14, a step-up and -down converter 200 used in the battery-driven electronic device of this embodiment includes a step-down converting portion including first switching means 221, first rectification switching means 222 and an inductor 223, and a step-up converting portion sharing the inductor 223 with the step-sown converter portion and including second switching means 224 and second rectification switching means 225.

Furthermore, the step-up and -down converter 200 has a detecting circuit 226, a first control driving circuit 227, and a second control driving circuit 228. The detecting circuit 226 detects a voltage at an output capacitor 205 that is divided by a first detection resistor 261 having a resistance R1, a second detection resistor 262 having a resistance R2 and a third detection resistor 263 having a resistance R3, and compares the divided voltages with a reference voltage Eb that is output from a reference voltage source 260.

An error amplifier 264 receives a voltage $E1=Eo \cdot R3/(R1+R2+R3)$ at the connection point between the second detection resistor 262 and the third detection resistor 263 and the reference voltage Eb, and an error signal thereof is amplified and is output as a first control signal Ve1. An error amplifier 265 receives a voltage $E2=Eo \cdot (R2+R3)/(R1+R2+R3)$ at the connection point between the first detection resistor 261 and the second detection resistor 262 and the reference voltage Eb, and an error signal thereof is amplified and is output as a second control signal Ve2. Here, as the voltage of the output capacitor 205, a first preset value of the supply voltage is set to $Eoh=Eb \cdot (R1+R2+R3)/R3$ and a second preset value that is lower than the first preset value is set to $Eol=Eb \cdot (R1+R2+R3)/(R2+R3)$ in the acceptable range of the voltage required to be supplied to the load 206.

The first control driving circuit 227 turns the first switching means 221 on and off periodically at a duty ratio in accordance with the first control signal Ve1. That is to say, the first control driving circuit 227 reduces the duty ratio of the first switching means 221 when the level of the first control signal Ve1 is decreased, and controls the first switching means 221 to be on/off so that the voltage of the output capacitor 205 is stabilized to Eoh=Eb·(R1+R2+R3)/R3.

The second control driving circuit 228 turns the second switching means 224 on and off periodically at a duty ratio in accordance with the second control signal Ve2. That is to say, the second control driving circuit 228 controls the second switching means 224 to be on/off so that the voltage of the output capacitor 205 is stabilized to Eol=Eb·(R1+R2+R3)/(R2+R3) when the level of the second control signal Ve2 is decreased.

The operation of the battery-driven electronic device of this embodiment configured as above, in particular, the step-up and -down converter 200, will be described below.

First, when the battery voltage Ei is higher than the first preset value Eoh, in the step-down converting portion, the first control driving circuit 227 turns the first switching means 221 to be on/off so that the voltage Eo of the output capacitor 205 is adjusted to Eoh. Therefore, the voltage Eo becomes higher than the second preset value Eol, and in the detecting circuit 226, the second control signal Ve2 is decreased to the "L" level. In the step-up converting portion, since the second control signal Ve2 is in the "L" level, the second control driving circuit 228 fixes the second switching means 224 to operate at a duty ratio of 0%, that is, to be in the off-state. Therefore, the first switching means 221 and the first rectification means 222 that is operated to be on/off in conjunction with it accumulate and release magnetic energy with respect to the inductor 223, so that the step-up and -down converter 200 operates as a step-down converter that supplies the voltage Eoh from the output capacitor 205 to the loads 206 via the second rectification switching means 225.

When the battery voltage Ei is in decrease and becomes lower than the first preset value Eoh of the supply voltage, in the detecting circuit 226, the first control signal Ve1 is increased to the "H" level. Therefore, in the step-down converting portion, the first control driving circuit 227 fixes the first switching means 221 to operate at a duty ratio of 100%, that is, to be in the on-state. However, when the battery voltage Ei is higher than the second preset value Eol of the supply voltage, the 0% duty ratio operation is still performed in the step-up converting portion. Therefore, the battery voltage Ei is coupled directly to the output capacitor 205 via the fist switching means 221, the inductor 223 and the second rectification switching means 225. If it is assumed that the voltage drop in each element can be ignored, Eo=Ei is obtained.

When the battery voltage Ei is decreased further and becomes lower than the second preset value Eol of the battery voltage, in the detecting circuit 226, the second control signal Ve2 is increased from the "L" level. In the step-up converting portion, the second control driving circuit 228 turns the second switching means 224 to be on/off so that the voltage Eo of the output capacitor 205 is adjusted to the second preset value Eol. On the other hand, the 100% duty ratio operation is still performed in the step-down converting portion. Therefore, the second switching means 224 and the second rectification means 225 that is operated to be on/off in conjunction with it accumulate and release magnetic energy with respect to the inductor 223, so that the step-up and -down converter 200 operates as a step-up converter that supplies the voltage Eol from the output capacitor 205 to the loads 206.

As described above, according to this embodiment, in the case where the first preset value Eoh and the second preset value Eol of the supply voltage that is lower than the first preset value are provided in the acceptable range of the voltage supplied to the load 206, the battery voltage Ei satisfies Eol<Ei<Eoh, the step-up and -down converter 200 that is interposed between the battery 201 and the load 206 can be short-circuited. In this short-circuit, no switching means performs a switching operation, so that the characteristics of such a high efficiency in which switching loss does not occur are exhibited. Thus, when the step-up and -down converter 200 can be operated with a high efficiency, the battery use time can be prolonged.

In FIG. 14, diodes are used as the first rectification switching means 222 and the second rectification switching means 225, but the rectification switching means may be synchronization rectification switching means using switching means typified by MOSFETs or the like in order to decrease the on-voltage during conduction and reduce the conduction loss.

Fifth Embodiment

Figure 15:
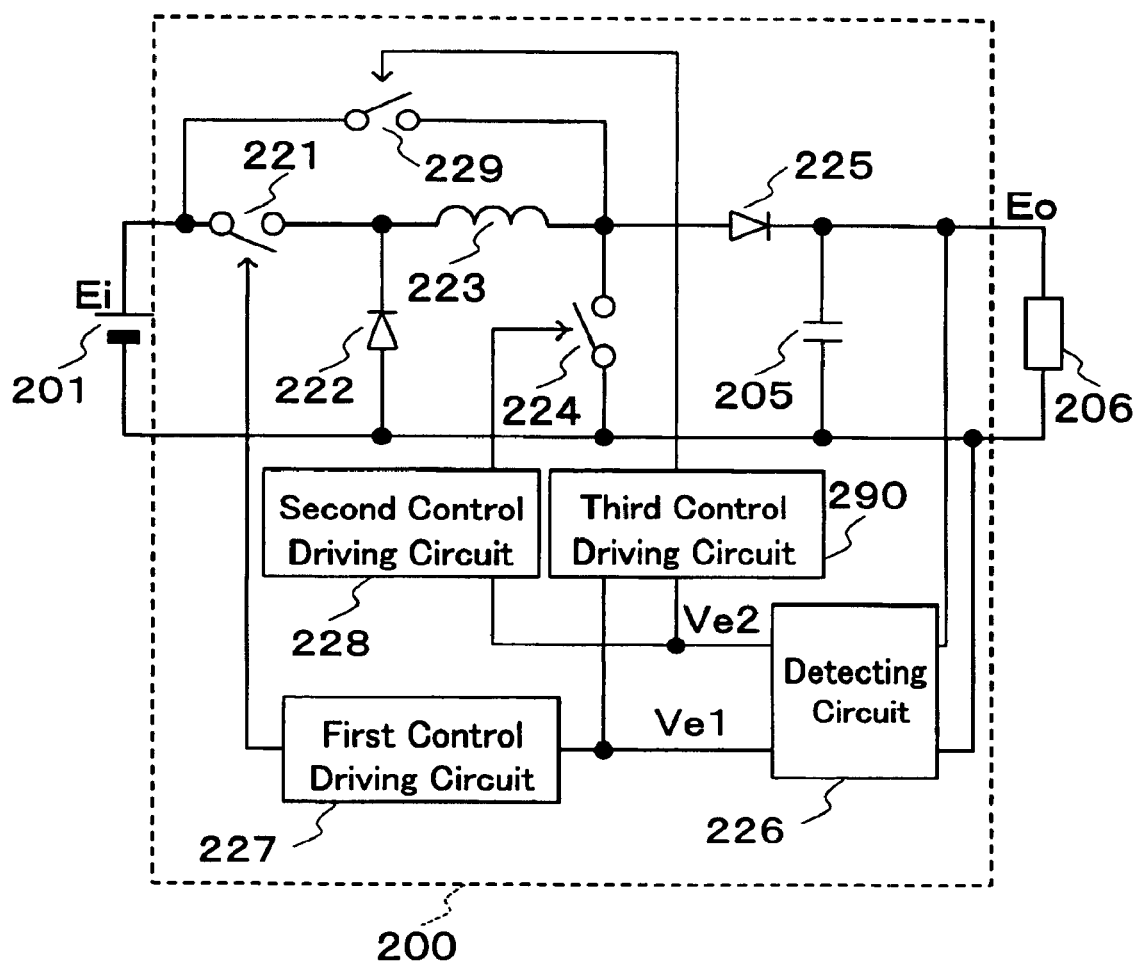
FIG. 15 is a circuit diagram showing the configuration of a battery-driven electronic device according to a fifth embodiment of the present invention.

FIG. 15 is a circuit diagram showing the configuration of a battery-driven electronic device according to a fifth embodiment of the present invention. This embodiment is obtained by adding some elements to the fourth embodiment in order to improve further the effect of the fourth embodiment shown in FIG. 14. FIG. 15 is different from FIG. 14 in that third switching means 229 straddling the first switching means 221 and the inductor 223, and a third control driving circuit 290 turning the third switching means 229 to be on when the first control signal Ve1 is in the level that fixes the first switching means 221 to be on and the second control signal Ve2 is in the level that fixes the second switching means 224 to be off are added.

The operation of the battery-driven electronic device of this embodiment configured as above, in particular, the step-up and -down converter 200, will be described below.

First, when the step-up and -down converter 200 operates as a step-down converter or a step-up converter, the third switching means 229 is in the off-state and does not participate in the operation.

When, the battery voltage Ei satisfies Eol<Ei<Eoh, the battery voltage Ei is coupled directly to the output capacitor 205 via the first switching means 221, the inductor 223, and the second rectification switching means 225, which is the same as in the four embodiment. In addition, since the first control signal Ve1 is in the level that fixes the first switching means 221 to be on and the second control signal Ve2 is in the level that fixes the second switching means 224 to be off, the third switching means 229 is in the on-state.

In the description in the fourth embodiment, it is assumed that the voltage drop in each element can be ignored, but in reality, a voltage drop occurs in each switching means, because of the on-voltage generated during conduction or the direct current in a direct current resistance component of the inductor 223, and they constitute the conductance loss. On the other hand, in this embodiment, the third switching means 229 connected in parallel to the first switching means 221 and the inductor 223 becomes on, so that such a conduction loss can be reduced further and the efficiency of the step-up and -down converter 200 can be enhanced further.

The third switching means 229 may straddle the second rectification switching means 225, instead of the first switching means 221 and the inductor 223. Which connection should be established can be determined so as to cover a larger conduction loss by comparing the conduction loss of the first switching means 221 and the conduction loss of the second rectification switching means 225.

Furthermore, it is natural to consider a configuration in which the third switching means 229 is connected while straddling the first switching means 221, the inductor 223 and the second rectification switching means 225. However, the step-up and -down converter 200 operates both as a step-down converter and a step-up converter. In this case, the third switching means 229 should be switching means that can control its on- and off-state, regardless of whether the voltage difference between the input terminal and the output terminal is positive or negative in the off-state, for example, a relay or switching means in which two FETs are connected in series such that their body diodes are oriented in opposite directions. Judging from its application, it is preferable that the on-voltage is lower.

Sixth Embodiment

Figure 16:
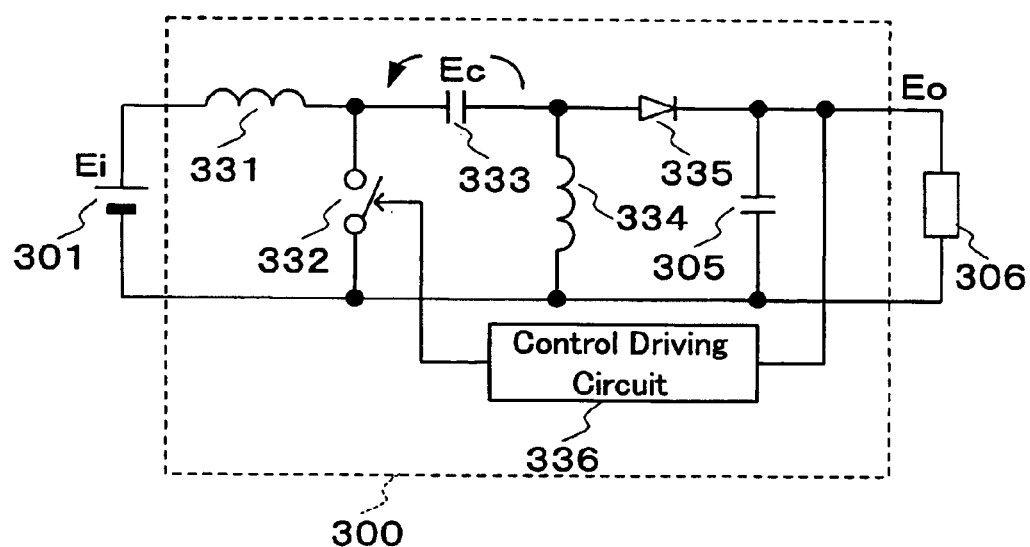
FIG. 16 is a circuit diagram showing the configuration of a battery-driven electronic device according to a sixth embodiment of the present invention.

FIG. 16 is a circuit diagram showing the configuration of a battery-driven electronic device according to a sixth embodiment of the present invention. As shown in FIG. 16, a step-up and -down converter 300 used in the battery-driven electronic device of this embodiment includes a first inductor 331, switching means 332, a coupling capacitor 333, a rectification switching means 335, a second inductor 334, an output capacitor 305 and a control driving circuit 336.

The first inductor 331 and the switching means 332 form a series circuit and are connected to a battery 301. The coupling capacitor 333 and the second inductor 334 form a series circuit and are connected to the opposite ends of the switching means 332. The rectification switching means 335 and the output capacitor 305 form a series circuit and are connected to the opposite ends of the second inductor 334. A converter having this configuration is a step-up and -down converter referred to as Sepic (Single Ended Primary Inductive Converter). The control driving circuit 336 has a function to control the switching means 332 to be on/off so that the voltage in the output capacitor 305 is adjusted to a predetermined value required to be supplied to the load 306.

The operation of the battery-driven electronic device of this embodiment configured as above, in particular, the step-up and -down converter Sepic, will be described below. For simplification, the capacitance of the coupling capacitor 333 is sufficiently large, and the coupling capacitor 333 is regarded as the voltage source of its voltage Ec.

First, when the switching means 332 is on, the battery voltage Ei is applied to the first inductor 331, and current from the battery 301 flows through the first inductor 331, and magnetic energy is accumulated. At the same time, the voltage Ec of the coupling capacitor 333 is applied to the second inductor 334, and current from the coupling capacitor 333 flows through the second inductor 334, and magnetic energy is accumulated. The rectification switching means 335 is off, because a voltage is applied in the opposite direction, and electrostatic energy accumulated in the output capacitor 305 is discharged and supplied to the load 306. This period is taken as Ton.

Next, when the switching means 332 is turned off, the voltage of the first inductor 331 is inverted. At the same time, the voltage of the second inductor 334 to which the coupling capacitor 333 is connected also is inverted. As a result, the rectification switching means 335 becomes on, and current flows from the battery 301 to charge the output capacitor 305 via the first inductor 331, the coupling capacitor 333, and the rectification switching means 335. This current releases the magnetic energy accumulated in the first inductor 331. On the other hand, the voltage Eo of the output capacitor 305 is applied to the second inductor 334, and current from the second inductor 334 flows to the output capacitor 305 via the rectification switching means 335, and the accumulated magnetic energy is released at the same time. This period is taken as Toff.

By repeating the on/off operation as described above, the magnetic energy is accumulated and released repeatedly in the first inductor 331 and the second inductor 334, and the coupling capacitor 333 and the output capacitor 305 are charged and discharged repeatedly. The condition that allows the accumulation and the release of the energy to be in equilibrium is that the current flowing through the first inductor 331 and the current flowing through he second inductor 334 are in equilibrium. Here, when the inductance of the first inductor 331 is taken as L1, the following equation is satisfied:

$$Ei \cdot Ton/L1 = (Ec + Eo - Ei) \cdot Toff/L1$$

When the inductance of the second inductor 334 is taken as L2, the following equation is satisfied:

$$Ec \cdot Ton/L2 = Eo \cdot Toff/L2$$

When these equations are rearranged, the following relationship can be obtained:

$$Ec = Ei, \ Eo/Ei = Ton/Toff$$

That is, in the step-up and -down converter Sepic, the control driving circuit 336 controls the switching means 332 to be on/off, so that the supply voltage Eo to the load 306, which is its output voltage, theoretically can be adjusted to an arbitrary voltage.

This feature of the step-up and -down converter Sepic is that since the first inductor 331 is provided in the input portion of the converter, the input current hardly can be varied and can be continuous. This aspect will not be described in detail, but it is known that the first inductor 331 and the second inductor 334 are magnetically coupled and its coupling coefficient is adjusted so that the input current can be zero-ripple current. On the other hand, the battery 301 has the characteristics that it tends to be weak with respect to a current in the form of pulse that varies sharply, thereby leading to short life time and reducing the capacity. Therefore, according to this embodiment, the Sepic, which hardly has sharp variations in the input current, is used as the step-up and -down converter, so that the disadvantages in the characteristics of the battery 301 as described above can be compensated and the lifetime is prevented from being short and a long time use can be achieved.

In FIG. 16, a diode is used as the rectification switching means 335, but the rectification switching means may be synchronization rectification switching means using switching means typified by MOSFETs or the like in order to decrease the on-voltage during conduction and reduce the conduction loss.

Seventh Embodiment

Figure 17:
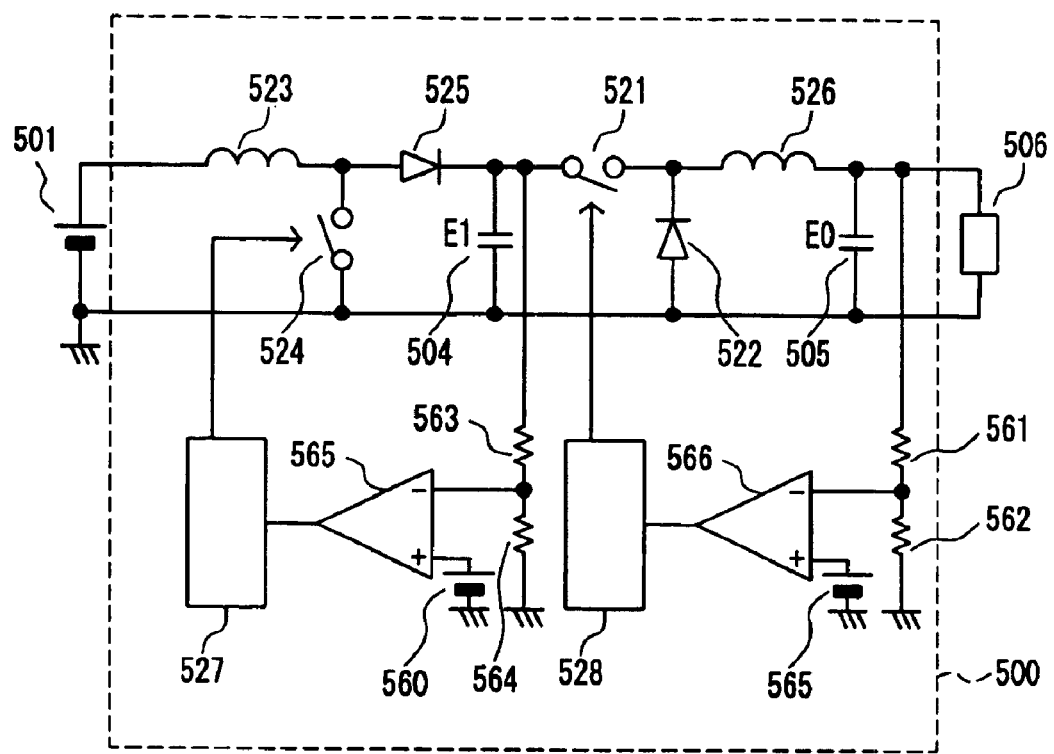
FIG. 17 is a circuit diagram showing the configuration of a battery-driven electronic device according to a seventh embodiment of the present invention.

FIG. 17 is a circuit diagram showing the configuration of a battery-driven electronic device according to a seventh embodiment of the present invention. As shown in FIG. 17, a step-up and -down converter 500 used in the battery-driven electronic device of this embodiment includes a step-up converter including first switching means 524, first rectification switching means 525, an inductor 523, and a first capacitor 504, and a step-down converter that receives an intermediate voltage E1, which is the output voltage of the step-up converter, and includes second switching means 521, second rectification switching means 522, a second inductor 526, and a second capacitor 505.

In the step-up converter, an intermediate voltage in the first capacitor 504 is detected, and control is performed so as to be stabilized to the predetermined intermediate voltage E1. In the step-down converter, a voltage in the second capacitor 505, which will be the output voltage Eo of the step-up and -down converter 500, is detected, and control is performed so as to be stabilized to a voltage necessary for the load.

When the output voltage of the battery 501 is higher than the intermediate voltage E1, the intermediate voltage E1 becomes close to the output voltage of the battery 501 independently from the step-up converter. When the output voltage of the battery 501 becomes lower than the intermediate voltage E1, the step-up converter controls such that the intermediate voltage E1 is stabilized. The output voltage Eo to be supplied to the load is stabilized by the step-down converter.

The circuit configuration of this embodiment is different from that of the fourth embodiment in that in the fourth embodiment, the step-down converter is in the front stage and the step-up converter is in the rear stage, whereas in this embodiment, the step-up converter is in the front stage and the step-down converter is in the rear stage. As in the fourth embodiment, when the step-up converter is in the rear stage, the current flowing to the output capacitor 205 of the step-up and -down converter 200 shown in FIG. 14 is not continuous, so that it is necessary to increase the capacitance of the output capacitor 205 in order to reduce the ripples of the output voltage. For example, when a power amplifier for wireless transmission of the CDMA (Code Division Multiple Access) of the third generation is used as the load, the ripple voltage of the supply voltage should be reduced as much as possible because it may cause the strain of the power amplifier for wireless transmission. When the audio mode is changed to the data transmission mode, the power for wireless transmission also is changed to substantially the maximum extent, and therefore it is necessary to change the supply voltage, that is, the output voltage of the step-up and -down converter from a small value to a large value. Therefore, the supply voltage should be shifted rapidly in order to increase the transmission time as much as possible.

In order to reduce the ripple voltage of the supply voltage, it is necessary to increase the capacitance of the output capacitor 205, but when this capacitance is increased, there is the contradicting problem that it takes a long time to change the supply voltage significantly because the energy amount of the output capacitor is increased.

Therefore, as in this embodiment, when the configuration of the step-up and -down converter is such that the step-up converter is in the front stage, and the step-down converter is in the rear stage, the output current from the step-down converter in the rear stage is continuous, so that it is possible to reduce both the ripple voltage and the capacitance of the output capacitor.

For the intermediate voltage E1, the lower limit is a voltage that can provide the power at the maximum voltage and the maximum current required by the load 506, that is, a voltage obtained by adding the maximum voltage to a value obtained by multiplying a resistance component between the first capacitor 504 and the second capacitor 505 by the maximum current. By setting a value close to this voltage, the step-down converter in the rear stage can operate with a good efficiency, that is, in the state where the second switching means 521 is constantly on.

In FIG. 17, diodes are used as the first rectification switching means 525 and the second rectification switching means 522, but the rectification switching means may be synchronization rectification switching means using switching means typified by MOSFETs or the like in order to decrease the on-voltage during conduction and reduce the conduction loss.

Eighth Embodiment

Figure 18:
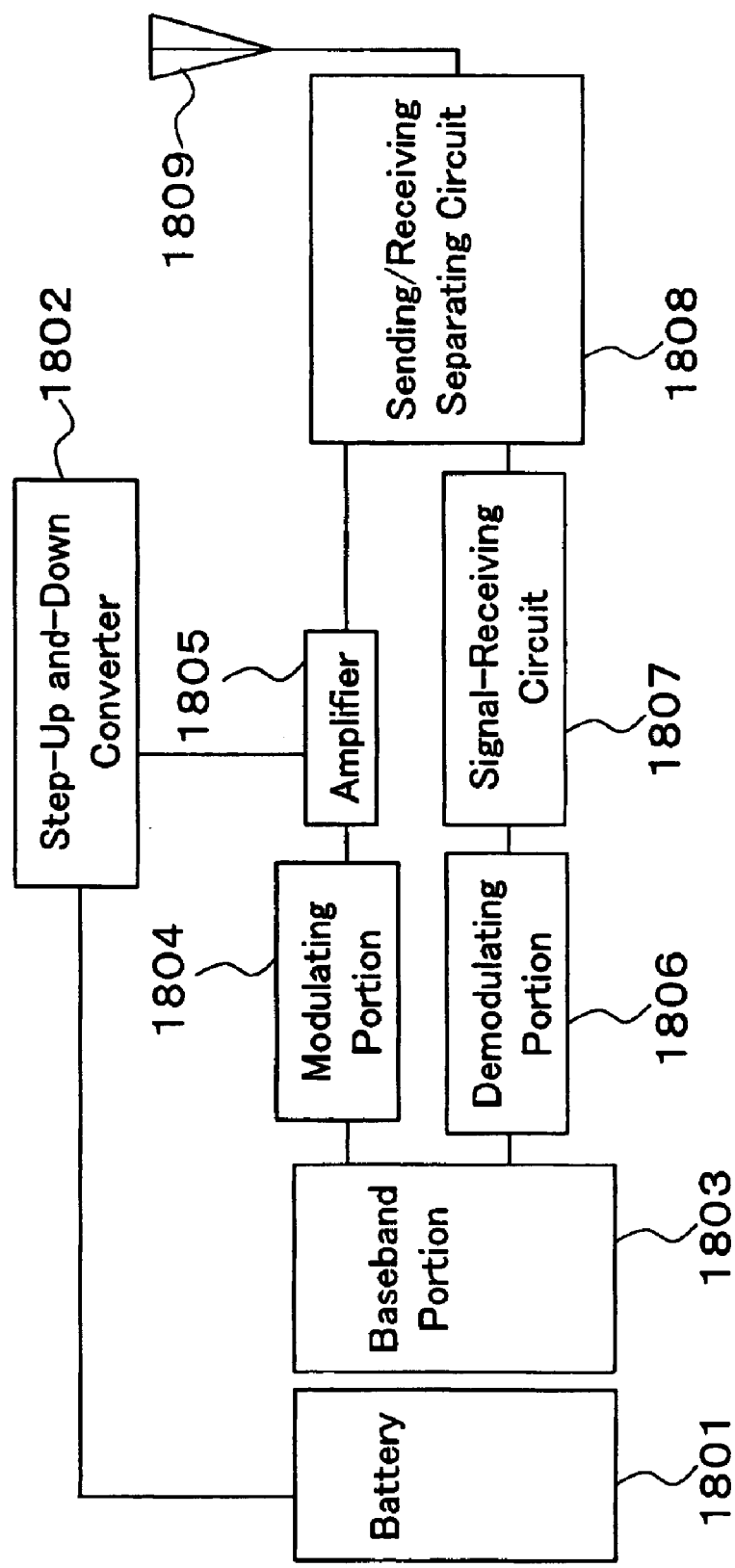
FIG. 18 is a block diagram showing the circuit configuration of a portable telephone as mobile communications equipment in which the battery-driven electronic device of the first to the seventh embodiment of the present invention is mounted.
Figure 19:
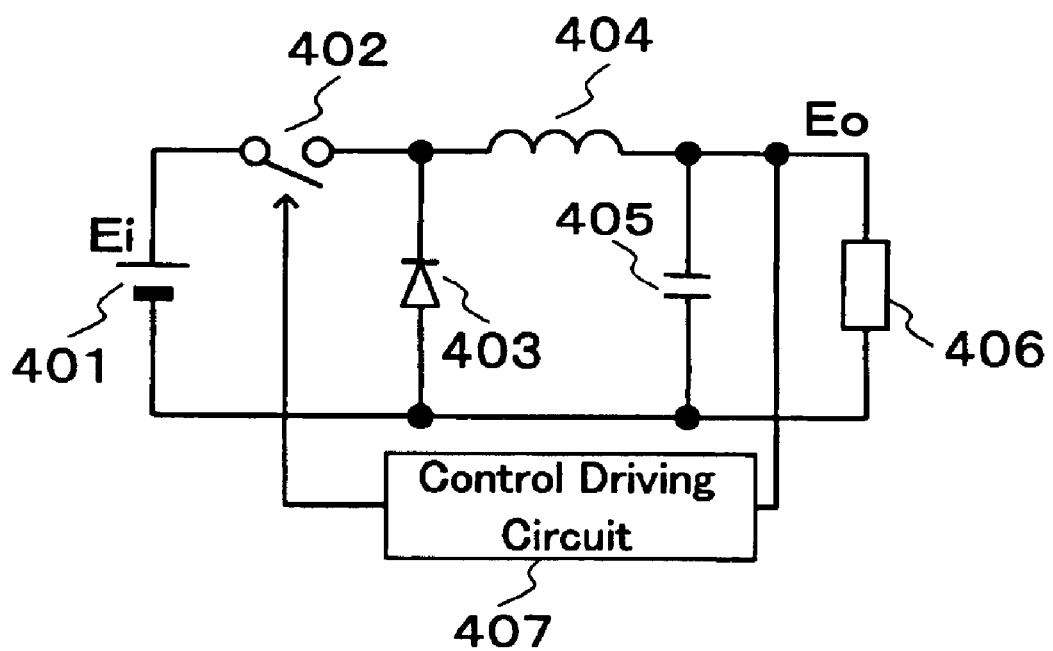
FIG. 19 is a circuit diagram showing the configuration of a conventional battery-driven electronic device.

FIG. 18 is a block diagram showing the circuit configuration of a portable telephone in which the battery-driven electronic devices of the first to the seventh embodiment is mounted as mobile communications equipment according to an eight embodiment of the present invention.

In FIG. 18, at the time of sending signals, data generated in a baseband portion 1803 are modulated in a modulating portion 1804, and signals output from the modulating portion 1804 are amplified to a required power in an amplifying portion 1805 and radiated from an antenna 1809 via a sending/receiving separating circuit 1808.

On the other hand, at the time of receiving signals, the signals received by the antenna 1809 are amplified to a required power in a signal-receiving circuit 1807 via the sending/receiving separating circuit 1808, are frequency-converted, if necessary, and are demodulated to baseband signals in a demodulating portion 1806 and input to the baseband portion 1803.

The step-up and -down converter 1802 receives the output voltage of the battery 1801 and supplies the voltage to the amplifying portion 1805, and changes the supply voltage in accordance with power that is output from the amplifying portion 1805 so as to increase the efficiency of the amplifying portion 1805.

In the fourth to the seven embodiment, a capacitor may be inserted in parallel to the battery between the battery and the step-up and -down converter. By inserting a capacitor, the ripple current of the step-up and -down converter can be prevented from flowing through the battery, so that the use time of the battery can be prolonged. Furthermore, it is possible to reduce the ripple voltage generated between the battery and the step-up and -down converter.

As described above, according to the present invention, compared with the conventional lithium ion battery, the discharge capacity is larger (the energy density per unit volume or unit weight is higher). On the other hand, by combining the battery having the characteristics that the battery voltage change ratio of the battery voltage is as large as 0.25 or more and the average battery voltage is low and the step-up and -down converter, the step-up and -down converter performs an operation of lowering the voltage when the discharge characteristics of the battery are higher than the supply voltage required by the load, and the step-up and -down converter performs an operation of raising the voltage when the discharge characteristics of the battery are lower than the supply voltage required by the load, so that the large discharge capacity (high energy density) of the battery can be utilized effectively and the battery-driven electronic device and the mobile communications equipment can be used for a longer time.

Furthermore, the supply voltage to the load is within the range in which the battery voltage of the battery is changed with the discharge of the battery, and further the average battery voltage associated with the discharge of the battery is matched to the supply voltage to the load, so that the advantage that the battery use time of the battery-driven electronic device can be prolonged can be obtained.

Furthermore, the advantageous effects that the step-up and -down converter can be operated with high efficiency, and the battery use time of the battery-driven electronic device can be prolonged can be obtained by operating in the following manner. When the supply voltage to the load has a predetermined variation range, the entire variation range or a part thereof matches the entire battery voltage change range of the battery or a part thereof. Moreover, the voltage required to be supplied to the load has a predetermined variation range, the probability distribution of the required supply voltage in the variation range has one peak value, and the difference between the required supply voltage at the peak of this probability distribution and the average battery voltage of the battery is within a predetermined potential difference range.

Furthermore, according to the present invention, when the difference between the supply voltage to the load and the output voltage of the battery is within a predetermined potential defference range, the step-up and -down converter has a function to fix the active component interposed between its input and its output to be on, so that the following advantageous effects can be obtained: high efficiency characteristics in which the switching loss does not occur are exhibited; and the battery use time of the battery-driven electronic device can be prolonged.

Moreover, the step-up and -down converter can has a function to short-circuit some or all of the components interposed between its input and its output, so that when the difference between the supply voltage to the load and the output voltage of the battery is within a predetermined potential difference range, the following advantageous effects can be obtained: the switching loss does not occur; the conduction loss also can be reduced; the efficiency can be improved further, and the battery use time of the battery-driven electronic device and the mobile communications equipment can be prolonged.

According to the present invention, by using Sepic as the step-up and -down converter, the ripple components of the input current of the step-up and -down converter can be reduced. That is to say, the following advantageous effects can be obtained: sharp variations in the discharge current of the battery can be reduced, so that characteristics of the battery can be prevented from deteriorating, and the lifetime can be prevented from being short and the use time can be prolonged.

According to the present invention from another aspect, by using the step-up and -down converter having a combination of a step-up converter in the front stage and a step-down converter in the rear stage, in addition to the advantageous effect that the battery use time can be prolonged, output ripples can be reduced, and output voltage switching can be performed at a high speed, and thus this is an optimal configuration when a power amplifier for wireless transmission of the CDMA (Code Division Multiple Access) system is used as the load.

What is claimed is:

1. A battery-driven electronic device comprising:
a battery having discharge characteristics that a battery voltage change ratio, which is a value obtained by dividing a voltage difference (Ec−Ed) by Ec, where Ec is an open circuit voltage after a rated charge end voltage is reached, and Ed is an open circuit voltage after a rated discharge end voltage is reached, is 0.25 or more;
a step-up and -down converter that has an output voltage of the battery as an input source, performs at least a step-down operation mode and a step-up operation mode in accordance with the output voltage of the battery, and outputs a predetermined voltage; and
a load to which the output voltage of the step-up and -down converter is supplied.

2. A battery-driven electronic device comprising:
a battery having discharge characteristics that a battery voltage change ratio, which is a value obtained by dividing a voltage difference (Ec−Ed) by Ec, where Ec is an open circuit voltage after a rated charge end voltage is reached, and Ed is an open circuit voltage after a rated discharge end voltage is reached, is 0.25 or more;
a step-up and -down converter that has an output voltage of the battery as an input source, performs a step-up and -down operation mode in accordance with the output voltage of the battery, and outputs a predetermined voltage; and
a load to which the output voltage of the step-up and -down converter is supplied.

3. The battery-driven electronic device according to claim 1 or 2, wherein the battery is a lithium secondary battery.

4. The battery-driven electronic device according to claim 1 or 2, wherein the battery is a prismatic battery, and an energy density per unit volume of the prismatic battery is 460 Wh/1 or more.

5. The battery-driven electronic device according to claim 1 or 2, wherein the battery is cylindrical battery, and an energy density per unit volume of the cylindrical battery is 530 Wh/1 or more.

6. The battery-driven electronic device according to claim 1 or 2, wherein a supply voltage required to be supplied to the load is within a range of the rated charge end voltage and a rated discharge last stage voltage of the battery.

7. The battery-driven electronic device according to claim 6, wherein a difference between an average battery voltage associated with discharge characteristics of the battery and the supply voltage to the load is within a predetermined range.

8. The battery-driven electronic device according to claim 1, wherein the supply voltage required to be supplied to the load has a predetermined variation range, and an entire variation range of the supply voltage or a part thereof matches an entire range of the rated charge end voltage and rated discharge last stage voltage of the battery or a part thereof.

9. The battery-driven electronic device according to claim 8, wherein the supply voltage required to be supplied to the load has a predetermined variation range, a probability distribution of the required supply voltage in the predetermined variation range has one peak value, and a difference between the required supply voltage at the peak of the probability distribution and an average battery voltage associated with discharge characteristics of the battery is within a predetermined range.

10. The battery-driven electronic device according to claim 1, wherein the load comprises a power amplifier for wireless transmission.

11. Mobile communications equipment wherein the battery-driven electronic device according to claim 10 is mounted.

12. The battery-driven electronic device according to claim 1, wherein when a difference between the supply voltage to the load and the output voltage of the battery is within a predetermined range, the step-up and -down converter has a function to fix an active component interposed between its input and its output to be on.

13. The battery-driven electronic device according to claim 12, wherein the step-up and -down converter comprises:

first switching means whose one end is connected to one end of the battery;

first rectification switching means whose one end is connected to the other end of the first switching means, and whose other end is connected to the other end of the battery;

an inductor whose one end is connected to the other end of the first switching means;

second switching means whose one end is connected to the other end of the inductor, and whose other end is connected to the other end of the battery;

second rectification switching means whose one end is connected to one end of the second switching means, and whose other end is connected to one end of the load;

an output capacitor whose one end is connected to one end of the load, and whose other end is connected to the other end of the battery and the other end of the load and that supplies a voltage to the load;

a detecting circuit that detects the supply voltage at the output capacitor, outputs an error signal between the detected supply voltage and a first preset value for performing the step-down operation mode as a first control signal, and outputs an error signal between the detected supply voltage and a second preset value for performing the step-up operation mode as a second control signal;

a first control driving circuit that controls the first switching means to be on/off so that the supply voltage is adjusted to the first preset value in accordance with the first control signal; and a second control driving circuit that controls the second switching means to be on/off so that the supply voltage is adjusted to the second preset value in accordance with the second control signal.

14. The battery-driven electronic device according to claim 13, wherein the detecting circuit comprises:

a series circuit of a first detection resistor, a second detection resistor and a third detection resistor, to which the supply voltage is applied;

a reference voltage source that outputs a reference voltage;

a first error amplifier to which a potential at a connection point between the first detection resistor and the second detection resistor and the reference voltage are input, and outputs the first control signal; and a second error amplifier to which a potential at a connection point between the second detection resistor and the third detection resistor and the reference voltage are input, and outputs the second control signal.

15. The battery-driven electronic device according to claim 1, wherein when a difference between the supply voltage to the load and the output voltage of the battery is within a predetermined range, the step-up and -down converter has a function to short-circuit some or all components interposed between its input and its output.

16. The battery-driven electronic device according to claim 15, wherein the step-up and -down converter comprises:

first switching means whose one end is connected to one end of the battery;

first rectification switching means whose one end is connected to the other end of the first switching means, and whose other end is connected to the other end of the battery;

an inductor whose one end is connected to the other end of the first switching means;

second switching means whose one end is connected to the other end of the inductor, and whose other end is connected to the other end of the battery;

third switching means whose one end is connected to one end of the first switching means, and whose other end is connected to the other end of the inductor;

second rectification switching means whose one end is connected to one end of the second switching means, and whose other end is connected to one end of the load;

an output capacitor whose one end is connected to one end of the load, and whose other end is connected to the other end of the battery and the other end of the load and that supplies a voltage to the load;

a detecting circuit that detects the supply voltage at the output capacitor, outputs an error signal between the detected supply voltage and a first preset value for performing the step-down operation mode as a first control signal, and outputs an error signal between the detected supply voltage and a second preset value for performing the step-up operation mode as a second control signal;

a first control driving circuit that controls the first switching means to be on/off so that the supply voltage is adjusted to the first preset value in accordance with the first control signal;

a second control driving circuit that controls the second switching means to be on/off so that the supply voltage is adjusted to the second preset value in accordance with the second control signal, and a third control driving circuit that turns the third switching means on, when the first control signal is in a level that fixes the first switching means to be on, and the second control signal is in a level that fixes the second switching means to be off.

17. The battery-driven electronic device according to claim 15, wherein the step-up and -down converter comprises:

first switching means whose one end is connected to one end of the battery;

first rectification switching means whose one end is connected to the other end of the first switching means, and whose other end is connected to the other end of the battery;

an inductor whose one end is connected to the other end of the first switching means;

second switching means whose one end is connected to the other end of the inductor, and whose other end is connected to the other end of the battery;

second rectification switching means whose one end is connected to one end of the second switching means, and whose other end is connected to one end of the load;

third switching means whose one end is connected to one end of the inductor, and whose other end is connected to the other end of the second rectification switching means;

an output capacitor whose one end is connected to one end of the load, and whose other end is connected to the other end of the battery and the other end of the load and that supplies a voltage to the load;

a detecting circuit that detects the supply voltage at the output capacitor, outputs an error signal between the detected supply voltage and a first preset value for performing the step-down operation mode as a first control signal, and outputs an error signal between the detected supply voltage and a second preset value for performing the step-up operation mode as a second control signal;

a first control driving circuit that controls the first switching means to be on/off so that the supply voltage is adjusted to the first preset value in accordance with the first control signal;

a second control driving circuit that controls the second switching means to be on/off so that the supply voltage is adjusted to the second preset value in accordance with the second control signal, and a third control driving circuit that turns the third switching means on, when the first control signal is in a level that fixes the first switching means to be on, and the second control signal is in a level that fixes the second switching means to be off.

18. The battery-driven electronic device according to claim 2, wherein the step-up and -down converter comprises:

a first inductor whose one end is connected to one end of the battery;

switching means whose one end is connected to the other end of the first inductor and whose other end is connected to the other end of the battery;

a coupling capacitor whose one end is connected to the other end of the first inductor;

a second inductor whose one end is connected to the other end of the coupling capacitor and whose other end is connected to the other end of the battery;

rectification switching means whose one end is connected to one end of the second inductor, and whose other end is connected to one end of the load;

an output capacitor whose one end is connected to one end of the load, and whose other end is connected to the other end of the battery and the other end of the load and that supplies a voltage to the load; and control driving means that controls the switching means to be on/off in order to adjust the supply voltage to a predetermined value required to be supplied to the load.

19. The battery-driven electronic device according to claim 1, wherein the step-up and -down converter comprises:

a first inductor whose one end is connected to one end of the battery;

switching means whose one end is connected to the other end of the first inductor, and whose other end is connected to the other end of the battery;

first rectification switching means whose one end is connected to the other end of the first inductor;

a first capacitor whose one end is connected to the other end of the first rectification switching means, and whose other end is connected to the other end of the battery;

switching means whose one end is connected to the other end of the first inductor, and whose other end is connected to the other end of the battery;

first rectification switching means whose one end is connected to the other end of the first inductor;

a first capacitor whose one end is connected to the other end of the first rectification switching means, and whose other end is connected to the other end of the battery;

second switching means whose one end is connected to the other end of the first rectification switching means;

second rectification switching means whose one end is connected to the other end of the second switching means, and whose other end is connected to the other end of the battery;

a second inductor whose one end is connected to one end of the second rectification switching means, and whose other end is connected to one end of the load;

a second capacitor whose one end is connected to one end of the load, and whose other end is connected to the other end of the battery and the other end of the load and that supplies a voltage to the load;

a first detecting circuit that detects an intermediate voltage at the first capacitor, and outputs an error signal between the detected intermediate voltage and an intermediate voltage preset value for performing the step-up operation mode as a first control signal; and a second detecting circuit that detects the supply voltage at the second capacitor, and outputs an error signal between the detected supply voltage and a supply voltage preset value for performing the step-down operation mode as a second control signal;

a first control driving circuit that controls the first switching means to be on/off so that the intermediate voltage at the first capacitor is adjusted to the intermediate voltage preset value in accordance with the first control signal;

a second control driving circuit that controls the second switching means to be on/off so that the supply voltage at the second capacitor is adjusted to the supply voltage preset value in accordance with the second control signal.

20. The battery-driven electronic device according to claim 19, wherein the intermediate voltage preset value is set to a value obtained by adding a maximum voltage required by the load to a value obtained by multiplying a resistance between the first capacitor and the second capacitor by a maximum current required by the load.

21. The battery-driven electronic device according to claim 2, wherein the battery is a lithium secondary battery.

22. The battery-driven electronic device according to claim 2, wherein the battery is a prismatic battery, and an energy density per unit volume of the prismatic battery is 460 Wh/l or more.

23. The battery-driven electronic device according to claim 2, wherein the battery is cylindrical battery, and an energy density per unit volume of the cylindrical battery is 530 Wh/l or more.

24. The battery-driven electronic device according to claim 2, wherein a supply voltage required to be supplied to the load is within a range of the rated charge end voltage and a rated discharge last stage voltage of the battery.

25. The battery-driven electronic device according to claim 2, wherein the supply voltage required to be supplied to the load has a predetermined variation range, and an entire variation range of the supply voltage or a part thereof matches an entire range of the rated charge end voltage and rated discharge last stage voltage of the battery or a part thereof.

26. The battery-driven electronic device according to claim 2, wherein the load comprises a power amplifier for wireless transmission.

* * * * *

UNITED STATES PATENT AND TRADEMARK OFFICE
CERTIFICATE OF CORRECTION

PATENT NO.    : 6,882,130 B2
DATED         : April 19, 2005
INVENTOR(S)   : Handa et al.

It is certified that error appears in the above-identified patent and that said Letters Patent is hereby corrected as shown below:

Column 26,
Lines 22, 24, 28 and 32, "1 or 2" should read -- 1 --.

Signed and Sealed this

Twenty-ninth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,882,130 B2
DATED : April 19, 2005
INVENTOR(S) : Handa et al.

It is certified that error appears in the above-identified patent and that said Letters Patent is hereby corrected as shown below:

<u>Column 29,</u>
Lines 58-66, delete "switching means whose one end is connected to the other end of the first inductor, and whose other end is connected to the other end of the battery; first rectification switching means whose one end is connected to the other end of the first inductor; a first capacitor whose one end is connected to the other end of the first rectification switching means, and whose other end is connected to the other end of the battery;".

Signed and Sealed this

Sixteenth Day of May, 2006

JON W. DUDAS
*Director of the United States Patent and Trademark Office*